US008538858B2

(12) United States Patent
Sutton et al.

(10) Patent No.: US 8,538,858 B2
(45) Date of Patent: Sep. 17, 2013

(54) APPARATUS AND METHOD FOR COMMODITY TRADING WITH AUTOMATIC ODD LOT HEDGING

(75) Inventors: Heath E. Sutton, Lenexa, KS (US); Jason G. Tatge, Lenexa, KS (US)

(73) Assignee: Farms Technology, LLC, Overland Park, KS (US)

( * ) Notice: Subject to any disclaimer, the term of this patent is extended or adjusted under 35 U.S.C. 154(b) by 0 days.

(21) Appl. No.: 13/084,864

(22) Filed: Apr. 12, 2011

(65) Prior Publication Data

US 2012/0215672 A1    Aug. 23, 2012

Related U.S. Application Data

(60) Provisional application No. 61/446,036, filed on Feb. 23, 2011.

(51) Int. Cl.
*G06Q 40/00* (2012.01)
(52) U.S. Cl.
USPC .......................................................... 705/37
(58) Field of Classification Search
USPC ............................... 705/35, 36, 37, 38, 39, 40
See application file for complete search history.

(56) References Cited

U.S. PATENT DOCUMENTS

| | | | |
|---|---|---|---|
| 4,674,044 A | 6/1987 | Kalmus et al. | |
| 4,677,552 A | 6/1987 | Sibley, Jr. | |
| 4,903,201 A | 2/1990 | Wagner | |
| 5,063,507 A | 11/1991 | Lindsey et al. | |
| 5,077,665 A | 12/1991 | Silverman et al. | |
| 5,136,501 A | 8/1992 | Silverman et al. | |
| 5,285,383 A | 2/1994 | Lindsey et al. | |
| 5,297,031 A | 3/1994 | Gutterman et al. | |
| 5,706,442 A | 1/1998 | Anderson et al. | |
| 5,715,402 A | 2/1998 | Popolo | |
| 5,727,165 A | 3/1998 | Ordish et al. | |
| 5,732,400 A | 3/1998 | Mandler et al. | |
| 5,775,734 A | 7/1998 | George, Jr. | |
| 5,787,156 A | 7/1998 | Katz | |

(Continued)

FOREIGN PATENT DOCUMENTS

| | | |
|---|---|---|
| JP | 11232354 A1 | 8/1999 |
| WO | WO0157752 A1 | 8/2001 |

OTHER PUBLICATIONS

US Reexamination Control No. 95/000432, filed Jan. 29, 2009 to Reding et al. (Reexamination of 7,418,423, issued Aug. 26, 2008).
www.usafutures.com, dated Jan. 25, 1999.

(Continued)

*Primary Examiner* — Rajesh Khattar
(74) *Attorney, Agent, or Firm* — Law Offices of Grady L. White, LLC

(57) ABSTRACT

Apparatus and method for trading commodities with automatic hedging for odd lot offers. The apparatus automatically accepts odd lot offers on behalf of buyers and aggregates them with other odd lot offers of the same commodity symbol until there are enough bushels to reach a predetermined threshold, or "tipping point," which causes the system to automatically calculate the optimum number of full lot futures contracts to sell at the market price in order to offset risk associated with accepting the odd lot offers, and to automatically secure the optimum number of full lot futures contracts. The system reduces or eliminates situations where no transactions are executed due to the market's failure to reach a certain price, and reduces the buyers' exposure to slippage on accumulated odd lots.

24 Claims, 17 Drawing Sheets

(56) References Cited

U.S. PATENT DOCUMENTS

| | | | |
|---|---|---|---|
| 5,794,207 | A | 8/1998 | Walker et al. |
| 5,845,266 | A | 12/1998 | Lupien et al. |
| 5,873,071 | A | 2/1999 | Ferstenberg et al. |
| 5,884,286 | A | 3/1999 | Daughtery, III |
| 5,924,082 | A | 7/1999 | Silverman et al. |
| 5,930,767 | A | 7/1999 | Reber et al. |
| 5,960,411 | A | 9/1999 | Hartman et al. |
| 5,970,479 | A | 10/1999 | Shepherd |
| 6,012,925 | A | 1/2000 | Kelly et al. |
| 6,014,643 | A | 1/2000 | Minton |
| 6,058,379 | A | 5/2000 | Odom et al. |
| 6,131,087 | A | 10/2000 | Luke et al. |
| 6,134,535 | A | 10/2000 | Belzberg |
| 6,272,474 | B1 | 8/2001 | Garcia |
| 6,317,728 | B1 | 11/2001 | Kane |
| 6,338,050 | B1 | 1/2002 | Conklin et al. |
| 6,390,472 | B1 | 5/2002 | Vinarsky |
| 6,393,406 | B1 | 5/2002 | Eder |
| 6,401,041 | B1 | 6/2002 | Peterson |
| 6,418,419 | B1 | 7/2002 | Nieboer et al. |
| 6,584,451 | B1 | 6/2003 | Shoham et al. |
| 6,598,027 | B1 | 7/2003 | Breen et al. |
| 6,622,129 | B1 | 9/2003 | Whitworth |
| 6,673,479 | B2 | 1/2004 | McArthur et al. |
| 6,754,636 | B1 | 6/2004 | Walker et al. |
| 6,862,580 | B1 | 3/2005 | Ford |
| 6,988,083 | B2 | 1/2006 | Dines et al. |
| 7,043,449 | B1 | 5/2006 | Li et al. |
| 7,076,452 | B2 | 7/2006 | Florance et al. |
| 7,347,161 | B2 | 3/2008 | Pratt |
| 7,418,423 | B2 | 8/2008 | Reding |
| 7,587,352 | B2 * | 9/2009 | Arnott .......................... 705/36 T |
| 7,742,979 | B2 | 6/2010 | Reding |
| 7,840,475 | B2 | 11/2010 | Tatge et al. |
| 2001/0032162 | A1 | 10/2001 | Alsberg et al. |
| 2001/0032165 | A1 | 10/2001 | Friend et al. |
| 2001/0034663 | A1 | 10/2001 | Teveler et al. |
| 2001/0049649 | A1 | 12/2001 | Baecker et al. |
| 2002/0002530 | A1 | 1/2002 | May |
| 2002/0013735 | A1 | 1/2002 | Arora et al. |
| 2002/0023038 | A1 | 2/2002 | Fritsch et al. |
| 2002/0023039 | A1 | 2/2002 | Fritsch et al. |
| 2002/0032644 | A1 | 3/2002 | Corby et al. |
| 2002/0046127 | A1 | 4/2002 | Reding |
| 2002/0052826 | A1 | 5/2002 | Dines et al. |
| 2002/0059091 | A1 | 5/2002 | Hay et al. |
| 2002/0065765 | A1 | 5/2002 | Shuler et al. |
| 2002/0095369 | A1 | 7/2002 | Kaplan et al. |
| 2002/0120555 | A1 | 8/2002 | Lerner |
| 2002/0138393 | A1 | 9/2002 | Tatge |
| 2002/0178102 | A1 | 11/2002 | Scheinberg et al. |
| 2002/0194115 | A1 | 12/2002 | Nordlicht et al. |
| 2003/0050901 | A1 | 3/2003 | Jester |
| 2003/0055664 | A1 | 3/2003 | Suri |
| 2003/0195822 | A1 | 10/2003 | Tatge et al. |
| 2004/0230493 | A1 | 11/2004 | Tatge et al. |
| 2004/0236637 | A1 | 11/2004 | Tatge et al. |
| 2005/0114252 | A1 | 5/2005 | Beurskens |
| 2005/0137964 | A1 | 6/2005 | Nordlicht et al. |
| 2006/0259417 | A1 | 11/2006 | Marynowski et al. |
| 2009/0177574 | A1 | 7/2009 | Tatge et al. |

OTHER PUBLICATIONS www.foodmarketexchange.com, dated Jun. 20, 2000.

"Grain Price Hedging Basics," dated Oct. 1995.

Lawnin, James et al., "Financial instruments help producers hedge gas deals in volatile market" Oil & Gas Journal, 91 (44):52-60 (Nov. 1, 1993).

Crawford, P., "The New High-Tech Investing: Computer as Fund Manager," International Herald Tribune, NY, NY (Feb. 1, 1992).

Scheli, B. L., "Electronic Trading of Agricultural Products," Commonwealth Club, San Francisco, pp. 1-22 (Jul. 8, 1980).

Hayenga, M. L. et al., Formula Pricing in Five Commodity Marketing Systems. American Journal of Agricultural Economics, 62(4):753-759 (Nov. 1980).

Ins and Outs of Program Trading, and Why It's Being Blamed for Market Collapse; [Orange County Edition] Los Angeles Times (pre-1997 Fulltext), p. 14 (Dec. 6, 1987).

Ethridge, D. E., "A Computerized Remote-Access Commodity Market: Telcot," Southern Journal of Agricultural Economics, 177-182 (Dec. 1978).

CBOT-E-MarketPlace, E-Market Place, pp. 1-4, http://web.archive.org/web/19990420082100/www.cbot.com/points_of_interest/emarket/ . . . (Oct. 10, 2008).

Fields, G., "Here is How Trading Stocks by Computer Works," The Miami Herald, FL, p. 14A, at http://nl.newsbank.com/nl-search/we/Archives?p_action=doc&p_docid+0EB3684411FE . . . (Oct. 15, 2008).

Blank, S. C., "Research on Futures Markets: Issues, Approaches, and Empirical Findings," Western Journal of Agricultural Economics, 14(1):126-139 (1989).

Kastens, T. L. et al., "Post-Harvest Grain Storing and Hedging with Efficient Futures," Journal of Agricultural and Resource Economics 24(2):482-505 (1999).

Adam, B. D. et al. (1993) "Storage Hedging: What's a Merchandiser to Do?," Proceedings of the NCR-134 Conference on Applied Commodity Price Analysis, Forecasting, and Market Management, Chicago, IL. [http://www.farmdoc.uiuc.edu/nccc134].

Norvell, J. M. and Leuthold, R. M. (1992). "Simulanteously Derived Optimal Hedging Ratios for East Central Illinois Corn and Soybean Producers." Proceedings of the NCR-134 Conference on Applied Commodity Price Analysis, Forecasting, and Market Risk Management. Chicago, IL. [http://www.farmdoc.uiuc.edu/nccc134].

Patterson, M. D. et al. (1994) "Hedge Ratio Estimation and Soybean Storage Estimation and Soybean Storage," Proceedings of the NCR-134 Conference on Applied Commodity Price Analysis, Forecasting, and Market Risk Management. Chicago, IL [http://www.farmdoc.uiuc.edu/nccc134].

Zanini, F. C. et al. (1997) "Did Producer Hedging Opportunities in the Live Hog Contract Decline?" Proceedings of the NCR-134 Conference on Applied Commodity Price Analysis, Forecasting, and Market Risk Management. Chicago, IL [http://www.farmdoc.uiuc.edu/nccc134].

Moschini, G. and Aradhyula, S. (1993). "Constant or Time-Varying Optimal Hedge Ratios?" Proceedings of the NCR-134 Conference on Applied Commodity Price Analysis, Forecasting, and Market Risk Management. Chicago, IL. [http://www.farmdoc.uiuc.edu/nccc134].

Strobl, M. et al. (1992). "An Examination of the Spatial and Intertemporal Aspects of Basis Determination." Proceedings of the NCR-134 Conference on Applied Commodity Price Analysis, Forecasting, and Market Risk Management. Chicago, IL. [http://www.farmdoc.uiuc.edu/nccc134].

""Gambling in Futures" The Real Meaning of the Phrase and the Part Played by the Speculator in the Business Life of the Nation." The New York Times (Jan. 9, 1910).

New York Mercantile Exchange, "A Guide to Energy Hedging" (Dec. 1999).

Purcell, W. D. and Koontz, S. R. (1999). Agricultural futures and options: principles and strategies. Second Edition.

Board of Trade of the City of Chicago, "Commodity Trading Manual" (1998).

The World Book Encyclopedia, Ci-Cz vol. 4. World Book, Inc., pp. 873-874 (1994).

Webster's Ninth New Collegiate Dictionary (1990). Merriam-Webster Inc. Phillipines p. 265.

Wayback Machine/Ohio State University: Chapter 1 Purchasing Cattle, Jun. 7, 2002, at http://beef.osu.edu, pp. 1-5.

* cited by examiner

FIG. 3  Mode of Operation: Offers Can be Bought Prior to Securing Corresponding Hedges. Tipping Point = 2500 bu.

| | Offer | | Market Hedge | Buyer Position | WAITING TO BE HEDGED |
|---|---|---|---|---|---|
| | Pending | Bought | Executed | | |
| T0 | | | | 0 bu. | 0 bu. |
| T1 | Offer 1001 / 1000 bu. | Offer 1001 / 1000 bu. | | +1000 bu. | 1000 bu. |
| T2 | Offer 1002 / 1000 bu. | Offer 1002 / 1000 bu. | | +2000 bu. | 2000 bu. |
| T3 | Offer 1003 / 1000 bu. | Offer 1003 / 1000 bu. | | +3000 bu. | 3000 bu. |
| T4 | | | Hedge 1001 / 5000 bu. | −2000 bu. | 0 bu. |
| T5 | Offer 1004 / 1000 bu. | Offer 1004 / 1000 bu. | | −1000 bu. | 0 bu. |
| T6 | Offer 1005 / 2000 bu. | Offer 1005 / 2000 bu. | | +1000 bu. | 1000 bu. |
| T7 | Offer 1006 / 5000 bu. | Offer 1006 / 5000 bu. | | +6000 bu. | 6000 bu. |
| T8 | Offer 1007 / 5000 bu. | Offer 1007 / 5000 bu. | | +11,000 bu. | 11,000 bu. |
| T9 | | | Hedge 1002 / 10,000 bu. | +1000 bu. | 1000 bu. |

APPARATUS AND METHOD FOR COMMODITY TRADING WITH AUTOMATIC ODD LOT HEDGING

CROSS-REFERENCE TO RELATED APPLICATIONS

This application is related to and claims priority under 35 U.S.C. §119 to provisional patent application No. 61/446,036, filed on Feb. 23, 2011, which is incorporated into this application in its entirety by this reference.

FIELD OF ART

This invention generally relates to commodity trading systems with an automatic hedging function, and more particularly to commodity trading systems with automatic hedging for odd lot offers.

BACKGROUND ART

U.S. Pat. No. 7,742,979 to Reding, et al., incorporated herein in its entirety by this reference, discloses a commodity trading system with an automatic hedging function, wherein sellers, such as grain producers and farmers, submit offers to sell commodities for cash, and buyers, such as elevator operators, ethanol plant operators, or cattle raisers, submit basis information that the commodity trading system uses to calculate cash bids for the commodities. The disclosed commodity trading system automatically monitors the seller's cash offers and buyers' basis information for each commodity, as well as the current prices for futures contracts for the commodity, and calculates, on behalf of each buyer, a cash bid price for the sellers' offers. The cash bid prices are calculated by adding the buyers' bases to the current price for a futures contract for the commodity. Notably, since the commodities exchange price can change many times over a given time period, and can fluctuate rapidly from one moment to the next, so can the calculated cash bid prices.

If, at any point in time, a seller's offer price or a buyer's basis falls to a certain number, or the current commodities exchange price for a commodity rises to a certain number, such that the calculations performed by the commodity trading system indicates that the seller's offer price currently matches (i.e., is currently less than or equal to) the buyer's computer-calculated cash bid price, then the commodity trading system disclosed in U.S. Pat. No. 7,742,979 will automatically transmit to the commodities exchange a request to sell a futures contract for the price used by the system to calculate the buyer's bid price. In other words, it will automatically attempt to execute a limit order for a futures contract. If the futures contract (or hedge) is sold for the price that resulted in the calculated match, then the commodity trading system will automatically accept the seller's cash offer on behalf of the buyer, and without the buyer's intervention. However, so long as the limit order for the futures contract has not yet been executed (i.e., the hedge has not been acquired), then the commodity trading system will not accept the seller's cash offer on behalf of a buyer, and no sale will occur between the seller and the buyer. This functionality ensures that, before the seller's cash offer is accepted and the buyer becomes obligated to buy the commodity from the seller, the buyer will have already sold a futures contract (acquired a hedge) on the commodities exchange that corresponds to the size and price of the seller's offer. It also ensures that no cash offer is accepted on behalf of the buyer unless and until a corresponding futures contract is sold for a price that is high enough to preserve the buyer's basis. Therefore, the commodity trading system disclosed in U.S. Pat. No. 7,742,979 essentially prevents cash offers from being automatically accepted on behalf of any buyers until after a limit order for a corresponding futures contract (hedge) has been automatically transmitted and automatically executed by the system.

Although the above-described commodity trading system with automatic hedging provides significant advantages over commodity trading systems without automatic hedging, it has nevertheless been found that such systems do not deal well with odd lots. On some commodity exchanges, futures contracts may only be obtained in a specified minimum lot size, such as 5,000 bushels, or in integer multiples of the minimum lot size, such as $10,000 bushels, $15,000 bushels, 20,000 bushels, and so on. A contract to buy or sell a quantity of the commodity equal to the minimum lot size on the futures market is called a "full lot" contract, while a contract to buy or sell a quantity of the commodity equal to an even multiple of the minimum lot size in the futures market (2×, 3×, 4×, and so on) is typically called a "round lot" contract. Sellers do not always offer to sell their commodities in full or round lot sizes. In fact, more often than not, the quantities and sizes of sellers' offers are determined by the size and capacity of the sellers' farms, production facilities and transportation equipment, and not by any lot size requirements or policies promulgated by a commodity exchange. Thus, sellers frequently extend offers to sell the commodities in odd lot sizes, such as, for example, 1,000 bushels, 3,500 bushels, 8,000 bushels, 19,500 bushels, 31,000 bushels, and so on.

In an effort to deal with odd lot offers, systems like the one described above are sometimes configured to automatically track odd lot offers, without accepting them, and then count and aggregate the bushels associated with the collection of odd lot offers, until a sufficient number of bushels have been counted and accumulated to support a full or round lot futures contract. When the quantity of bushels associated with that collection of odd lot offers equals or exceeds the number of bushels required for a full or round lot futures contract, and the current commodities exchange price has risen to a value high enough so that the calculated bid price matches (i.e., equals or exceeds) the cash offer price, it is then, and only then, that the above-described system will even attempt to sell a full or round lot futures contract to offset the risk associated with accepting, on the buyer's behalf, the accumulated collection of odd lot offers.

Alternatively, instead of delaying acceptance of the odd lot offers, counting and accumulating bushels, and attempting to sell a futures contract only after the number of accumulated odd lot bushels equals or exceeds a full or round lot size, some of the known systems are configured to attempt to sell enough full lot futures contracts to get as close as possible to the number of bushels in the odd lot offer. For example, if the system determines, based on a seller's offer price, a buyer's calculated bid price and a current commodities exchange price, that a futures contract (hedge) should be sold to offset the risk associated with accepting a cash contract offer of 17,000 bushels, but the commodities exchange only buys futures contracts in round lot increments of 5,000 bushels, then some of the known systems may be configured to automatically sell a "short" futures contract for a round lot size of 15,000 bushels. If the attempt to secure the 15,000 bushel futures contract is successful, then the system will automatically accept the seller's 17,000 bushel offer on the buyer's behalf, thereby obligating the buyer to buy 2,000 bushels more than she has sold, which exposes the buyer to the market risk and potential financial impact associated with the unhedged 2,000 bushels. If this happens a mere 100 times during the course of a busy trading day, then the buyer would find herself owning 200,000 more bushels than she has sold, and therefore vulnerable to considerable market risk. As a second alternative, some of the conventional commodity trading systems may instead be configured to automatically "oversell" the futures contract, rather than short it. So every time a 17,000 bushel offer is received, these systems will actually obtain a hedge (i.e., sell a futures contract) for 20,000 bushels, thereby obligating the buyer to sell 3,000 more bushels than she's bought every time this situation occurs. If this situation occurs 100 times in a single trading day, then at the end of the day the buyer will be obligated to sell 300,000 more bushels than she has bought, which probably constitutes an unacceptably high market risk for the buyer.

In addition to the problems described above, there is another very significant problem associated with all the above-described systems, regardless of whether they are configured to hold and aggregate odd lot offers, or immediately sell short or long futures contracts. As previously stated, the above-described systems are, by definition, configured to prevent any offers from being accepted until a "limit order" futures contract is sold. In other words, the futures contract must be sold for a price per bushel that is equivalent to the price required to make the calculated cash bid price for the buyer meet or exceed the seller's offer price. Depending on the activity in the market, that particular price required for the futures contract may not ever be obtainable, which means the "limit order" futures contract may not ever be executed, and the offers waiting for execution of those limit orders will not ever be accepted.

Suppose, for instance, that a buyer on one of the above-described systems receives an odd lot offer to sell 17,000 bushels for a price that requires securing a futures contract price of $4.25 per bushel (i.e., the seller's offer price–the buyer-specified basis=$4.25). Suppose further that the system is configured to attempt to sell a slightly "short" futures contract immediately, rather than delay acceptance of the offer and accumulate the bushels in an odd lot counter merely because it comprises an odd lot. Thus, when the system receives the 17,000 bushel offer, it is configured to attempt to sell a futures contract of 15,000 bushels immediately, which, if the attempt is successful, will leave the buyer holding 2000 more bushels than she has sold. But by the time the system contacts the commodities exchange with the instruction to sell the 15,000 bushel futures contract, and then waits in line for all of the earlier-received $4.25 per bushel futures contracts to be executed, the price per bushel for the futures contracts on the commodities exchange has fallen to $4.24 per bushel. Suppose further that the price of futures contracts for that particular commodity then hovers between $4.22 and $4.24 per bushel for the rest of the trading day, and never again reaches $4.25 per bushel. As a result of the futures contract price hovering all day at a mere 1-3 cents below the price in the instruction to sell the 15,000 bushel futures contract, the 15,000 bushel futures contract is never sold. Consequently, the 17,000 bushel offer is never executed, the seller never makes a sale, and the buyer never buys the grain, even though she really needed the grain and would have accepted the $4.23 futures contract price as well as the risk associated with buying 2000 more bushels than she sold. Nobody is happy because no grain has been sold. Suppose finally, that this situation occurs, or has the potential for occurring 100 or 1000 times during a trading day with 50 different odd lot offers for the same commodity. Even if the sum total of the bushels in the waiting odd lot offers measures in the tens of thousands, none of those offers are accepted and no business is transacted because of the market's failure to hit a certain number. It is for these reasons that the above-described commodity trading systems with automatic hedging are still considered wholly inadequate and even extremely problematic when it comes to handling odd lot offers.

Some conventional systems are configured to avoid the aforementioned problems and issues by tracking all of the odd lot offers received by the buyer and subsequently reporting the information to a human, who must then manually hedge all of the bushels in the odd lot offers before purchasing the bushels in the odd lot offers. The human tries to accomplish this by first aggregating all of the odd lot bushels together, and then attempting to sell an appropriate number of futures contracts at the current market price for the commodity. In this situation, the offer is only accepted and no transaction is completed unless and until the human is successful in tracking, summing and hedging all of the pending odd lot offers for each commodity (there may be hundreds of them), and obtaining offsetting full or round lot futures contracts for the odd lot offers before those odd lot offers are withdrawn or consumed by other buyers. During peak trading times in a volatile and fast-moving marketplace, this manual process of aggregating the negotiating futures contracts for potentially hundreds or thousands of left over odd lots, and potentially hundreds of different commodities is an extremely risky, unreliable, time consuming and error-prone process.

Accordingly, what is needed are commodity trading systems and methods for automatically accepting and processing odd lot offers when a sufficient number of bushels are accumulated to make a full lot, without exposing buyers to the unacceptably high market risk associated with always shorting or overselling the corresponding futures contracts, without putting buyers and sellers in situations where no business is transacted because, although more than enough bushels have been accumulated, no futures contracts are executed because the commodities exchange price has not reached a particular value required for execution of a limit order. What is also needed are systems and methods for processing odd lot offers effectively while confining the market risk associated with executing market orders for futures contracts within an acceptable range, and for intelligently determining, based on the buyer's current trading position for the commodity and the current quantity of the commodity waiting to be hedged, what would be the best time to sell a full lot futures contract, as well as the best number of full lot futures contracts to sell, all without human intervention.

SUMMARY

The present invention provides an apparatus and method for commodity trading with odd lot hedging capability, which is designed to satisfy the aforementioned needs. Embodiments of the invention not only automatically accept and hedge full and round lots on behalf of the buyer, but also automatically accepts and hedges odd lot offers in a manner that eliminates the need for human intervention in the process of dealing with odd lot offers, and also reduces the unacceptably high market risks typically associated with conventional automated odd lot hedging solutions.

For each buyer on the system, the present invention maintains counters that track, for each commodity and commodity symbol, the current number of bushels waiting to be hedged on behalf of the buyer (W), the buyer's current trading position (P) for the commodity, and a total number of odd lot bushels of the commodity currently hedged on behalf of the buyer (H). Each time an odd lot offer to sell a commodity is received by the system, the system will add the number of bushels in the odd lot offer (Q) to the number of bushels waiting to be hedged (W) until the number of bushels waiting to be hedged (W) reaches a predetermined tipping point (T) previously specified by the buyer or the system operator. Preferably, but not necessarily, the tipping point T is set at a value equal to about half of the size of a full lot, such as 2500 bushels. When the tipping point is reached (i.e., when W is greater than or equal to T), the total number of aggregated odd lot bushels waiting to be hedged is used to calculate the largest number N of full lot futures contracts to sell on the commodities exchange that will also keep the buyer's total trading position, and therefore, total risk, confined to the limited range defined by the tipping point, and therefore, considered acceptable by the buyer.

The system then automatically generates an order to sell N full lot futures contracts for a symbol (S) corresponding to the offered commodity at whatever the market price for that symbol S happens to be when the futures contract order is received on the commodities exchange, and also activates or invokes a programmatic interface to a futures contract service to execute the order. Since the automatically generated order to sell the futures contract is a market order, and not a limit order as in the prior art systems, the futures contract order for symbol S will be executed immediately and will not have to wait for the market to achieve a certain specified price. Thus, when the predetermined tipping point for a given buyer and a given commodity and corresponding symbol S is set at 2500 bushels, for instance, the apparatus and methods of the present invention will operate to sell one or more futures contracts for symbol S at the market price immediately upon the value W breaching the 2500 bushel threshold T, while also confining the buyer's current trading position for the commodity and symbol to the range of between −2500 and +2499 exclusively. Therefore, unlike the prior art systems that compound the buyer's market exposure by always shorting or always overselling every futures contract corresponding to an odd lot offer when there may be hundreds of such odd lot offers pending, systems operating according to the present invention will never permit the difference between the number of bushels bought and the number of bushels sold by the buyer to exceed the predefined tipping point T, no matter how many odd lot offers are pending.

Moreover, since the futures contract is sold immediately, regardless of the current market price, the system can accept the seller's offer substantially immediately, thereby enabling a sales transaction to occur between the buyer and the seller substantially immediately. This sales transaction could have been stalled indefinitely if execution of the futures contract were delayed until the futures contract price reaches a certain value. Thus, using the tipping point as a threshold trigger for selling a futures contract at the market price enables automatic hedging of the optimum number of bushels of a commodity immediately, based on the buyer's current trading position, and reduces and eliminates two of the most troubling problems associated with the methods used by prior art systems, namely price slippage and stalled or unexecuted sales transactions. Notably, the system will automatically determine whether the best action comprises shorting or going long on the futures contract, as compared to the size of the corresponding odd lot offers, and then automatically secure the long or short futures contract order.

Accordingly, in one aspect of the present invention, there is provided an apparatus for trading commodities, comprising a microprocessor, a memory, a customer database in the memory, a predetermined tipping point T in the memory, a server, a programmatic interface to a futures contract service (FCS) which can be invoked to sell one or more full lot futures contracts, and an odd lot hedging module having program instructions that, when executed by the microprocessor, cause the microprocessor to invoke the programmatic interface to sell the one or more full lot futures contracts, at the market price, based on the current values of certain conditions and operating parameters, stored in the memory and the database, which values are retrieved, manipulated and monitored by the odd lot hedging module, as described in detail below.

The customer database has a field that stores a wait counter W indicating a total number of units of the commodity currently waiting to be hedged on behalf of a particular buyer. The predetermined tipping point T in the memory, which may or may not be stored in the customer database, indicates a minimum number of units of the commodity that must currently be waiting to be hedged before a request to sell a full lot futures contract for the commodity can be executed on behalf of the buyer. The value of the predetermined tipping point T may be set to any value that the buyer considers an acceptable degree of risk. In preferred embodiments, however, the predetermined tipping point T is optimally set to about one-half the size of a full lot futures contract for the commodity.

The server receives and stores in the customer database an offer from a seller to sell a quantity Q of the commodity to the buyer, wherein the quantity Q comprises an odd lot size. The server also receives and stores in the database bid information it receives from buyers wishing to purchase the commodity. The odd lot hedging module is a computer program, application, subroutine or function in the memory of the system, which has program instructions that, when executed by the microprocessor, causes the microprocessor to use the values of the wait counter W, the predetermined tipping point T and the quantity Q to determine whether a market order to sell one or more full lot futures contracts for the commodity will be submitted in response to the offer having been received and stored in the customer database by the server. More particularly, the program instructions in the odd lot hedging counter are arranged to cause the microprocessor to retrieve the values for W, T and Q from the customer database and invoke the programmatic interface to the FCS to automatically secure one or more futures contracts for the commodity if the sum of the wait counter W and the quantity Q is greater than or equal to the predetermined tipping point T.

The odd lot hedging module also has program instructions that will cause the microprocessor to determine the number N of full lot futures contracts to include in the order to sell one or more futures contracts at the market price. The commodity trading system of the present invention includes programmatic interface to a futures contract service, and the odd lot hedging module further includes instructions that, when executed by the microprocessor, cause the microprocessor to activate the programmatic interface to submit the order to the futures contract service for execution. Preferably, the program instructions in the odd lot hedging module are also arranged to prevent the microprocessor from submitting the order to sell the full lot futures contracts for the commodity while the current value of the wait counter W for the commodity is less than the predetermined tipping point T, thereby preventing the system from selling a futures contract until the threshold defined by the predetermined tipping point T is breached. Notably, the predetermined tipping point T may be defined by the commodity trading system operator to apply to all buyers on the system, or alternatively, may be set individually by each buyer on the system. In some embodiments the system may even be configured to accept and use a different predetermined tipping point T for each commodity that the buyer trades in.

In some embodiments of the present invention, the size of a full lot futures contract for the commodity (F) is also stored in the memory of the system. In this case, the odd lot hedging module further comprises program instructions that, when executed by the microprocessor, cause the microprocessor to automatically calculate the number N of full lot futures contracts to include in the futures contract order according to the formula:

$$N=\text{floor}((F-T+W)/F).$$

where,

N=the number of full lot futures contracts to include in the order,

F=the size of a full lot futures contract for the commodity,

T=the predetermined tipping point, and

W=the total number of units of the commodity currently waiting to be hedged on behalf of the buyer. As is known by those skilled in the art, executing the floor function on a real number x finds the largest real integer not greater than x.

In addition to storing values for the odd lot quantity Q and the wait counter W, the customer database may further include fields that store a position counter P for the buyer, indicating the buyer's current trading position for the commodity, a hedge counter H for the buyer, indicating a total number of odd lot units of the commodity currently hedged on behalf of the buyer, and a mode of operation M for the buyer, indicating whether offers to sell the commodity to the buyer can be accepted on behalf of the buyer prior to securing a futures contract or a sufficient number of futures contracts to hedge all of the bushels in the offers. With these values stored in the database, the program instructions in the odd lot hedging module may be further arranged to cause the microprocessor to retrieve the values from the database and use them to determine whether a sufficient number of futures contracts have been secured to hedge the total number of bushels in the offer (represented by quantity Q) based on the current values of the position counter P, the hedge counter H and the quantity Q. The program instructions in the odd lot hedging module may also be arranged to prevent the microprocessor from accepting an offer (i.e., buying the commodity in the offer on behalf of the buyer) until: (i) the sufficient number of futures contracts have been secured to hedge the quantity Q in the offer, or (ii) the current value of the mode of operation M indicates that offers can be accepted on behalf of the buyer prior to securing the sufficient number of futures contracts to hedge the offers.

The odd lot hedging module also includes program instructions that, when executed by the microprocessor, cause the microprocessor to calculate new values for the wait counter W, the position counter P and the hedge counter H based on the order having been executed by the futures contract service, and store the new values in the corresponding fields of the customer database.

The customer database may further include a field for storing offer states indicating whether the offer is currently pending, waiting to be hedged or currently bought. The odd lot hedging module may also comprise program instructions that, when executed by the microprocessor, cause the microprocessor to: (i) compare the value of the position counter P to the sum of the quantity Q and the hedge counter H, (ii) if the position counter P is less than the sum of the additional units Q and the hedge counter H, set the value of the offer state field to indicate that the offer is currently waiting to be hedged, and (iii) if the position counter P is greater than or equal to the sum of the additional units Q and the hedge counter H, set the value of the offer state field to indicate that the offer is currently bought.

Embodiments of the present invention may also include an interface to a price feed, a trade eligibility field in the customer database and a matching module or program. The price feed continuously delivers to the commodity trading system, via the interface, current prices for the commodity on one or more commodity exchanges. The trade eligibility field in the customer database is configured for storing a value indicating whether an offer is eligible for a trade, based, in part, on the current commodity exchange price, as well as other factors, such as the buyer's approval (or disapproval) of the seller making the offer. The matching module comprises a computer software program having program instructions that, when executed by the microprocessor, causes the microprocessor to (i) calculate a buyer-specific cash price for the buyer based on changes to the updated commodity exchange price received via the price feed, and (ii) set the trade eligibility field in the customer database to indicate that the offer is eligible for a trade when the buyer's calculated cash price meets or exceeds the seller's offer price. In this configuration, the odd lot hedging module may further include program instructions that, when executed by the microprocessor, will not permit the microprocessor to attempt to secure a futures contract for the odd lot quantity Q in the offer unless the trade eligibility field indicates the offer is eligible for a trade.

The microprocessor calculates the buyer-specific cash price based on a buyer-specified basis included in the bid information that the server receives from the buyer. The basis (usually expressed as a negative number, such as −0.44 cents) is the difference between the local cash price paid by the buyer to a local farmer for the commodity and the relevant futures contract price for the commodity. By specifying a basis requirement in the bid information, the buyer is essentially setting and controlling the spread between the local cash price that the buyer is willing to pay, and the futures contract price for the commodity. Maintaining this spread permits the buyer to cover her costs, such as transportation to market and other costs associated with running her facilities, and also realize a certain profit margin. The matching module comprises program instructions that cause the microprocessor to retrieve the buyer-specified basis from the bid information in the customer database, and calculate a local cash price for the buyer by adding the buyer-specified basis to the updated commodity exchange price received via the price feed interface. In some embodiments, the program instructions in the matching module also cause the microprocessor to make the offer eligible for a trade (by changing the trade eligibility field) only if the calculated cash price (being based on the changing commodity exchange price) meets or exceeds the offer price.

In another aspect of the present invention, a method of trading commodities using a microprocessor, a memory, a database in the memory and an interface to a futures contract service is presented, the method comprising the steps of:

(a) storing in the database a wait counter W indicating a total number of units of the commodity currently waiting to be hedged on behalf of a buyer;

(b) storing in the memory a predetermined tipping point T indicating a minimum number of units of the commodity that must currently be waiting to be hedged before a request to sell a full lot futures contract for the commodity can be executed on behalf of the buyer, wherein the value of said predetermined tipping point T is less than the size F of a full lot futures contract for the commodity;

(c) receiving and storing in the database an offer from a seller to sell a quantity Q of the commodity to the buyer, wherein the quantity Q comprises an odd lot size; and (d) executing program instructions on the microprocessor that cause the microprocessor to invoke the interface to automatically secure one or more full lot futures contracts for the commodity when the sum of the wait counter W and the quantity Q is greater than or equal to the predetermined tipping point T.

In still another aspect of the present invention, there is provided non-transitory computer-readable storage medium, such as a tape, DVD, CDROM, memory card, portable disk drive, or other magnetic or optical storage area or device, with an executable program stored thereon, wherein the program has computer-executable program instructions that will cause a general purpose or specialized microprocessor to perform the following steps:

(a) storing in a database a wait counter W indicating a total number of units of the commodity currently waiting to be hedged on behalf of a buyer;

(b) storing in a memory a predetermined tipping point T indicating a minimum number of units of the commodity that must currently be waiting to be hedged before a request to sell one or more full lot futures contract for the commodity can be executed on behalf of the buyer;

(c) receiving and storing in the database an offer from a seller to sell a quantity Q of the commodity to the buyer, wherein the quantity Q comprises an odd lot size; and (d) invoking an interface to a futures contract service to sell said one or more full lot futures contracts, at a market price, when the sum of said wait counter W and said quantity Q is greater than or equal to the predetermined tipping point T.

BRIEF DESCRIPTION OF THE DRAWINGS

Exemplary and therefore non-limiting embodiments and variations of the present invention, and various aspects, features and advantages thereof, are explained in detail below with reference to and with the aid of the drawings, which constitute a part of this specification and include depictions of the exemplary embodiments. In these drawings:

FIG. 3 shows a timing diagram illustrating how offers are handled in an embodiment of the invention, wherein the mode of operation is set so that offers can be bought prior to securing corresponding futures contracts (hedges) for the offers.

FIGS. 6-33 show exemplary screenshots illustrating how offers are processed according to certain embodiments of the invention. In particular, these figures show how offers may be immediately bought, if the current values of the wait count, position count, hedge count and mode variables permit it, or otherwise put into a "waiting" state when calculations performed by the microprocessor dictate they cannot be immediately bought.

DETAILED DESCRIPTION OF EXEMPLARY EMBODIMENTS

Figure 1:
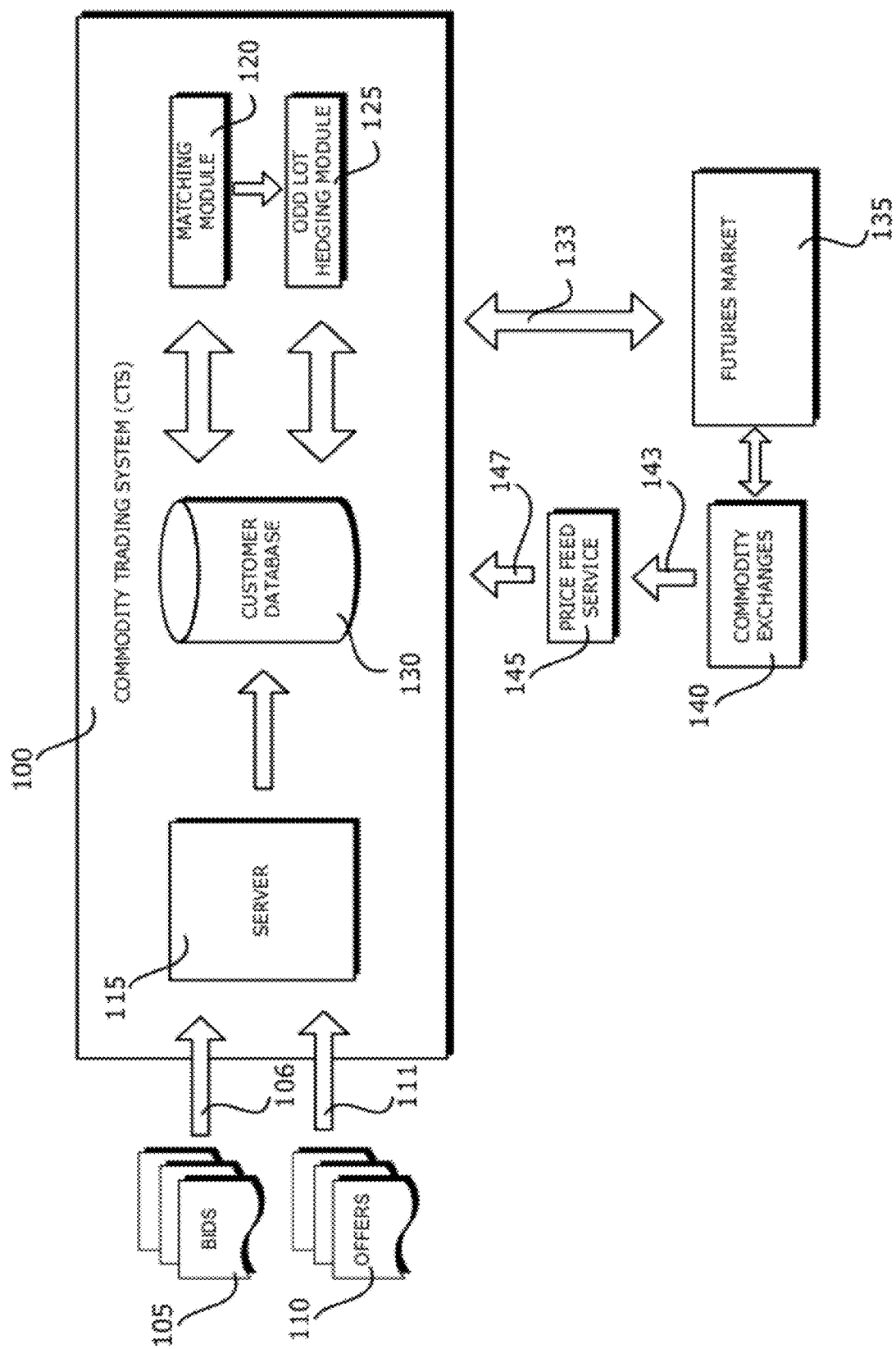
FIG. 1 shows a high-level data flow diagram for one exemplary embodiment of the present invention.

Non-limiting examples of systems and methods arranged and configured to operate according to certain embodiments and variations of the present invention will now be described in some detail by reference to the figures.

Overview

On certain commodity exchanges, such as the Chicago Board of Trade (CBOT), the minimum lot size for a futures contract is 5000 bushels. When local commodity producers, such as farmers, make offers to sell grain to commodity buyers, such as elevator operators, for an amount of grain that is not a multiple of 5000, the offer is considered to be an "odd lot" offer. For buyers who accept odd lot offers from local sellers, securing hedges in the futures market to reduce the financial risk associated with falling market prices typically requires a human trader to calculate the total sizes of the hedges needed for each type of commodity (i.e., each commodity symbol being traded) and to manually prepare separate market orders for futures contracts that must then be negotiated with a futures contract merchant for the commodity exchange. During peak trading times, this process can take too long and price changes in the market while this process is being carried out can eat away at the buyer's required profit margins. In addition, because it is a manual process, and because too many odd lot offers may come in all at once, some of these odd lot offers inevitably fail to get filled because the human trader may have made some mistakes in his or her calculations, may have missed some offers altogether, or simply could not physically handle all of the odd lot offers coming in on a given day.

In embodiments of the present invention, the system accepts odd lot offers on behalf of buyers and aggregates them with other odd lot offers received by the buyer for the same commodity symbol until the number of bushels waiting to be hedged reaches a predetermined threshold, or "tipping point," which causes the system to automatically calculate the optimum number of futures contracts to sell, and to automatically secure that optimum number of futures contracts immediately at the market price. Typically, the predetermined threshold is set to equal a value that is less than a full lot size. In particular, as odd lot offers are received on behalf of the buyers, systems and methods operating according the present invention will aggregate the number of bushels per symbol until it reaches the predetermined threshold of, say 2,500 bushels. At that time, the total number of bushels waiting to be hedged for that commodity symbol are used to calculate the largest possible full lot futures contract to sell so as to restrict the buyers current trading position to a range of +/−2,500 bushels. This process permits the optimum number of bushels of the commodity to be hedged at any given threshold trigger and reduces slippage in the event that more than one hedge would be created. By utilizing a predetermined threshold that is less than the full lot size, and by executing market orders for the futures contracts instead of limit orders, the system permits hedging sooner and more often than would be permitted if accumulating a full lot size were required or if particular market prices were required for the futures contracts, thus eliminating a significant amount of time wherein the buyer would otherwise be subject to the negative impacts of slippage on the accumulating odd lots, or both buyers and sellers would be prevented from doing business simply because the market failed to reach a certain price.

As is known by those skilled in the art, the term "slippage" refers to the difference between the expected price of a trade and the price at which the trade is actually executed. Slippage often occurs during periods of higher volatility, when market orders are used, and also when large orders are executed and there may not be enough interest at the desired price level to maintain the expected price of a trade. As is also known by those skilled in the art, a commodity "symbol," in the context of the commodity futures market, as well as this disclosure, refers to a designation such as "ZC10U," which identifies both the commodity and a time in the future that the commodity is expected to be delivered.

FIG. 1 shows a high-level data flow diagram for an embodiment of a commodity trading system 100 operating according to the principles of the present invention. As shown in FIG. 1, bids 105 and offers 110 are transmitted, via network links 106 and 111, to commodity trading system 100, where they are received by a server 115. The server 115 stores the bid and offer data in a customer database 130, where it can then be accessed, retrieved, manipulated and modified by a bid and offer matching module 120 and an odd lot hedging module 125 operating on the commodity trading system 100 to carry out, respectively, the offer matching and automatic odd lot hedging functions, as described in greater detail below. Current futures contract price data are periodically and repetitively delivered to the commodity trading system 100 from a remote commodity exchange 140 via a commodity price feed service 145. The price feed service 145 is connected to the commodity trading system 100 via a network link 147, and connected to one or more commodity exchanges 140 via network connection 143. As the commodity trading system 100 periodically receives the updated commodities exchange prices from the price feed service 145, it stores the updated prices in the customer database 130, where they are used by the matching module 120 to calculate the local cash prices for a plurality of buyers on the system and to determine whether any matches exist between the sellers' offers and the buyers' bids, based at least in part on the calculated local cash prices for the buyers.

For example, if the customer database 130 contains a record indicating that the current updated commodity exchange price for November corn is $2 per bushel, and another record indicating that the current buyer-supplied basis for November corn for a particular buyer is 45 cents, then the programming instructions in the matching module 120 are arranged to cause a microprocessor operating on the commodity trading system 100 to retrieve the current updated commodity exchange price and the buyer-supplied basis from the customer database 130 and calculate a local cash price of $1.55 for that particular buyer by subtracting the buyer-supplied basis for that particular buyer (45 cents) from the current updated commodity exchange price for November corn ($2). In preferred embodiments, this operation may be carried out repeatedly for every buyer enrolled in the system who has indicated an interest in entertaining offers to sell November corn each time the data received via the price feed service 145 indicates there has been a non-trivial change in the current price of November corn. The programming instructions in the matching module 120 then cause the microprocessor to compare the sellers' offer prices, offer sizes, requested points of delivery, and other terms embodied in the offers 110 for November corn with the calculated cash prices for the buyers of November corn, as well as the requested points of delivery and other terms embodied in the bids 105.

If a particular seller's offer price does not exceed the calculated local price of a particular buyer, and the other terms of the seller's offer and the buyer's bid information are consistent with each other, then the programming instructions in the matching module 120 will cause the microprocessor on the commodity trading system 100 to create or modify another record in the customer database 130 to indicate that the seller's offer "matches" the buyer's bid, and that the seller's offer is, therefore, "eligible" to trade. If the eligible offer is a round lot offer, then the matching module 120 on commodity trading system 100 automatically activates an electronic interface 133 to a futures market 135 to place an order for a round lot futures contract on commodity exchanges 140 to hedge the eligible offer. If, on the other hand, the eligible offer comprises an odd lot quantity, then the odd lot hedging module 125 is invoked to cause the processor to automatically initiate and then manage an odd lot hedging process according to an odd lot hedging algorithm, such as the exemplary algorithm illustrated in FIG. 5 and described in greater detail below.

It will be appreciated by those skilled in the art that server 115, customer database 130, matching module 120 and odd lot hedging module 125 may all reside on a single computer system or, alternatively, be distributed among a plurality of distinct computer systems operatively and communicatively connected to each other by way of known data communications interfaces, links and networking technology. It should also be apparent and appreciated to those skilled in the art that network links 106, 111, 143 and 147, as well as interface 133, may comprise any suitable hardware- and/or software-based data communications channel or link in any suitable or desired local area, wide area, virtual or private data communications network, including but not limited to, a corporate LAN, a corporate WAN, a virtual private network (VPN), the World Wide Web (WWW) or the Internet.

Figure 2:
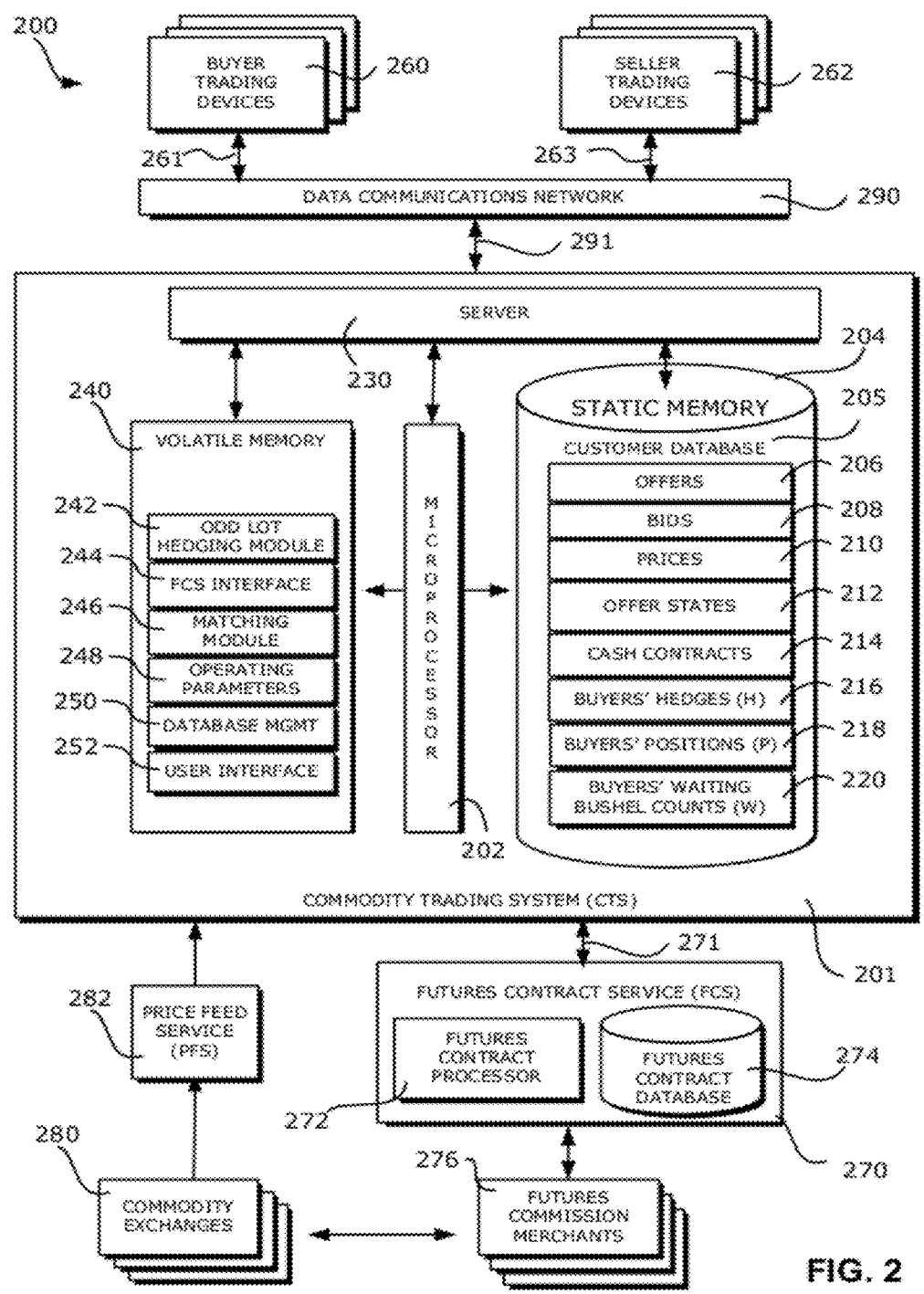
FIG. 2 shows a high-level block diagram depicting more detailed views of a commodity trading system, arranged to operate in accordance with the present invention, and a suitable computer networked environment 200 where the invention may be beneficially utilized.

FIG. 2 shows a more detailed view of a commodity trading system 201, arranged to operate in accordance with the present invention, and the associated computer networked environment 200 where the present invention finds beneficial utility. As shown in FIG. 2, the computer networked environment 200 includes a plurality of buyer trading devices 260 and a plurality of seller trading devices 262 connected to the commodity trading system 201 of the present invention through a data communications network 290 via network links 261, 263 and 291. The buyer trading devices 260 and seller trading devices 262 may comprise a combination of personal computers, notebook, pad or handheld computers, Internet-enabled smart phones or digital assistants. Data communications network 290 may comprise a local area network (LAN), a wide area network (WAN), such as the Internet or World Wide Web, a virtual private network or a corporate intranet. The computer networked environment 200 also includes a price feed service 282, electronically connected to one or more commodity exchanges 280, a futures contract service 270, which is communicatively coupled to one or more futures commission merchants 276, who are authorized to secure futures contracts on the commodity exchanges 280 on behalf of the buyers who use the buyer trading device 260 to submit bids for commodities on commodities trading system 201.

The commodities trading system 201 comprises a microprocessor 202, a static memory area 204 for housing a customer database 205, a server 230 and a volatile memory area 240 containing set of program modules 242, 244, 246, 248, 250 and 252 having program instructions and algorithms that can be executed by the microprocessor 202 to carry out the calculations and functions described herein. The server 230, customer database 205 may be integrated into the same physical machine as the microprocessor 202 and microprocessor program modules 242, 244, 246, 248, 250 and 252, as shown in FIG. 2, but some or all of these components may also reside on separate computer systems in a distributed arrangement without departing from the scope of the claimed invention.

The volatile memory area 240, which may comprise without limitation one or more local or remote, fixed or removable, permanent or temporary, magnetic or optical, random access memory areas, cache memory areas, or disk drives, contains a plurality of program modules for controlling the functions of microprocessor 202 to perform the method of trading commodities with odd lot hedging has described herein. Each module may comprise a computer software program, procedure, or process written as source code in a conventional programming language, and can be presented for execution by a CPU of microprocessor 202. The various implementations of the source code and object and byte codes can be stored on a computer-readable storage medium (such as a DVD, CDROM, floppy disk or memory card) or embodied on a transmission medium or carrier wave. The program modules of the volatile memory 240 include the odd lot hedging module 242, a futures contract service (FCS) interface 244, a matching module 246, operating parameters 248, a database management module 250, and a user interface module 252. In another embodiment, the program modules shown in volatile memory 240 can be presented for execution by the CPU of a network server (not shown in FIG. 2) in a distributed computing scheme.

Figure 5:
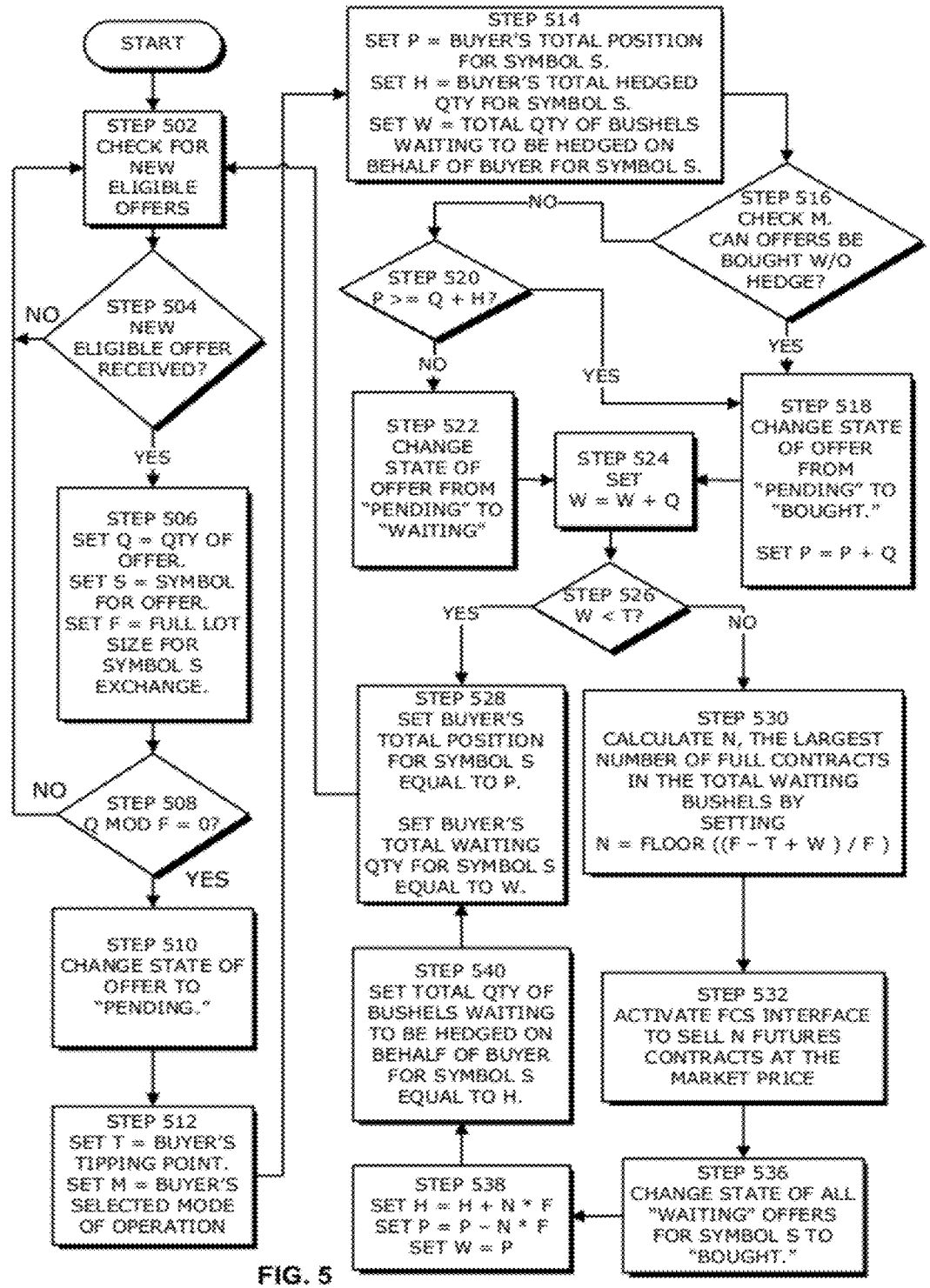
FIG. 5 shows a high-level flow diagram illustrating the steps that may be performed by the odd lot hedging module in some embodiments of the present invention to process odd lot offers.

In operation, odd lot hedging module 242 comprises program instructions that, when executed by the microprocessor 202, cause microprocessor 202 to carry out the steps shown in FIG. 5 to determine, based on information stored in the customer database 205, such as offers 206, bids 208, prices 210, offer states 212, cash contracts 214, buyers' hedges 216, buyers' positions 218 and buyer's current wait count 220, whether and when the next futures contract order will be submitted to a futures contract service 270 via the futures contract service (FCS) interface 244. The odd lot hedging module 242 also determines the optimum number of full lot futures contracts to secure based on the current values of the information and parameters stored in the customer database 205.

The database management module 250 organizes records, including operating parameters 248 and operator activities, and facilitates storing and retrieving of these records to and from the customer database 205. Any type of database organization can be utilized, including a flat file system, hierarchical database, relational database, or distributed database, such as those provided by Oracle Corporation, of Redwood Shores, Calif. The user interface module 252 accepts inputs from buyers, sellers and system operators, and facilitates rendering screens and data for transmission of status updates to the buyer and seller trading devices, 260 and 262, respectively, via server 230, data communications network 290 and network links 261, 263 and 291, as will be described in greater detail below and with reference to FIGS. 6-33.

The futures contract service 270 provides access to the futures markets, and typically, although not necessarily, uses its own futures contract processor 272 and futures contract database 274 to track information associated particularly with full and round lot futures contracts secured on behalf of buyers utilizing the commodity trading system 201. The FCS interface 244 is an application programming interface comprising a library of functions and subroutines that may be executed by microprocessor 202 to automatically communicate with the futures contract service 270 via a network link 271 to cause the futures contract service to secure one or more full lot futures contracts for the commodity on the commodity exchanges 280. The buyer trading devices 260 and seller trading devices 262 typically comprise standard personal or handheld computers cable of communicating with a typical server, such as server 230, using a standard web browser, such as Internet Explorer, over the data communications network 290, which may comprise the Internet and the World Wide Web. Sellers use seller trading devices 262 to submit offers to commodity trading system 201 and monitor buyer responses, while buyers use buyer trading devices 260 to submit bid information and to monitor, approve and accept sellers' offers. Server 230 may be implemented using any one of a number of different web server applications or programs, including, for example, Internet Information Services (IIS), available from Microsoft Corporation, of Redmond, Wash.

In one embodiment, communication between the commodity trading system 201, the buyer trading devices 260, the seller trading devices 262 and the futures contract service (FCS) 270 occurs over the Internet, represented generally as data communications network 290. In general, transactions on the Internet will occur between a client terminal and a server and will often utilize the hypertext transfer protocol (HTTP). This protocol permits client systems connected to the Internet to access independent and geographically scattered server systems also connected to the Internet. Client side browsers, such as Netscape's Navigator and Microsoft's Internet Explorer provide efficient graphical user interface based client applications that implement the client side portion of the HTTP protocol. Server side application programs, including the services performed by server 230 in FIG. 2, and generically referred to as HTTPd servers, implement the server side portion of the HTTP protocol. HTTP server applications are widely available. The distributed system of communication and information transfer made possible by the HTTP protocol is commonly known as the World Wide Web (WWW) or as simply "the Web." From a client side user interface perspective, a system of uniform resource locators (URLs) is used to direct the operation of a web browser in establishing transactional communication sessions with designated web server computer systems.

In use, client computer systems, such as buyer trading devices 260, will seek access to particular programs, services, documents or web pages located on the commodity trading system 201 and presented to clients by the operation of server 230. A generally closed hypertext transfer protocol transaction is conducted between a client browser application executing on the client system and the HTTP'd server applications executing on commodity trading system 201 and accessed through the server application 230. Web pages are served by the server 230 to the buyer trading devices 260 and the seller trading devices 262. Subsequent actions can occur by the clients selecting additional uniform resource locators (URLs) that may be embedded within the delivered pages. In addition, specific information can be requested by the server 230 and the buyer trading devices 260 and seller trading devices 262 can provide that information so that responsive communication can occur. As one alternative, the buyer trading devices 260 and seller trading devices 262 may be allowed to access the commodity trading system 201 directly, and login as a participant in an active data communication session. The present invention only requires that the various parties are capable of electronic communication.

Commodity trading system 201 is an HTTPd server system capable of storing data and transmitting that data across the Internet in response to authorized requests from client computer systems and devices. It is to be understood that server 230 can include a single server or a plurality of servers working together to achieve the desired result. Furthermore, the server 230 is meant to include both the hardware and the software necessary to make the system function as described. Buyers and sellers use the buyer and seller trading devices 260 and 262, which may be embodied in personal computers or hand held electronic devices that are capable of communication with commodity trading system 201 via data communications network 290.

Customer database 205 is associated with server 230 and microprocessor 202 so that both the server 230 and the microprocessor 202 can retrieve, modify and restore data in customer database 205, typically under the control of database management module 250. Within customer database 205, each individual buyer and each individual seller may have a portion of the database allocated especially for their individual use in storing offers, bids and other data associated with them, including commodity trading statuses and preferences.

Embodiments of the present invention may be configured to operate in one of at least two different operating modes. In one mode of operation, and as illustrated by the timing diagram of FIG. 3, the system is configured so that odd lot offers can be bought on behalf of the buyer prior to securing a futures contract for the offer. In another mode of operation, and as illustrated by the timing diagram of FIG. 4, odd lot offers cannot be bought until the hedge is secured.

The timing diagram of FIG. 3 illustrates how a series of consecutive offers may be handled in one embodiment of the invention, when the mode of operation is set so that offers can be bought prior to securing corresponding futures contracts (hedges) for the offers. As shown in FIG. 3, as offers come in, they initially enter the system having a pending status. Thus, at time T1 in FIG. 3, it can be seen that the system receives an offer identified as Offer 1001 for 1000 bushels. Because the mode of operation permits the system to buy offers immediately, without securing a hedge first, Offer 1001 is immediately bought on behalf of the buyer by the system, even though Offer 1001 is for an odd lot size (1000, instead of 5000 bushels). Therefore, the status of Offer 1001 for 1000 bushels is changed to "bought" in the same time slot (time slot T1) that it came into the system as pending. Notably, however, the system does not immediately execute a hedge for Offer 1001, because the tipping point threshold, which is 2,500 bushels in this case, has not been reached. However, the buyer's position is incremented by the size of the "bought" offer (i.e., 1000 bushels), as shown in the fifth column of FIG. 3, under the heading "Buyer Position." Because no futures contract is sold yet, the value of the wait counter, depicted in the far right column of FIG. 3, is also incremented by the size of Offer 1001 (i.e., by 1000 bushels). Similar steps are carried out when the system receives a second offer (Offer 1002 for 1000 bushels) in time slot T2, and a third offer (Offer 1003 for 1000 bushels) in time slot T3. In each case, the offer state is changed from pending to bought as soon as the offer arrives, and the position and waiting to be hedged counters are incremented by the size of the offer.

Notably, when the third offer, Offer 1003, comes in during time slot T3, it causes the number of bushels waiting to be hedged, listed in the far right column of FIG. 3, to exceed the 2,500 bushel tipping point for this buyer and this commodity. Accordingly, the next thing that happens, in time slot T4, is that the system automatically calculates and secures one full lot futures contract (labeled Hedge #101 for 5000 bushels) at the prevailing market price, which futures contract is then used to hedge the 3000 bushels bought on behalf of the buyer in response to having received offers 1001, 1002 and 1003. However, this leaves the buyer 2000 bushels short on grain because the size of the futures contract (5000 bushels) exceeds the size of the number of bushels waiting to be hedged (3000 bushels) by 2000 bushels.

When Offer 1004 for 1000 bushels arrives during time slot T5, just like the previous offers, it is immediately bought because the mode of operation setting permits the system to accept offer without a hedge. However, unlike the preceding offers, all of the bushels in Offer 1004 are immediately hedged because, at that point, the buyer needed to buy 2000 bushels from a seller to offset the extra 2000 bushels he sold in the futures market during time slot T4. Consequently, all 1000 bushels of Offer 1004 are considered already covered by the previous hedge, thereby reducing the buyer's shortfall on grain by 1000 bushels. Therefore, systems configured to operate according to embodiments of the present invention, will change the state Offer 1004 from pending to bought as soon as it arrives, and there is no need for attempting to obtain additional hedge.

As shown in the far right column of FIG. 3, the number of bushels waiting to be hedged does not again reach the predetermined tipping point until Offer 1007 for 9,500 bushels arrives and is bought by the system in time slot T8. The additional 9,500 bushels pushes the wait counter all the way up to 11,000 bushels. The odd lot hedging module then calculates the optimum number (N) of full lot futures contracts to sell at market price based on the full lot size (F), the predetermined tipping point (T) and the number of bushels waiting to be hedged (W), according to the formula:

$$N = \text{floor}((F-T+W)/F).$$

The details of the formula are discussed in greater detail below in the discussion associated with FIG. 5. In this case, the optimum number of full lot futures contracts to sell is 2. Therefore, the receipt of Offer 1007 in timeslot T8 triggers the sale in timeslot T9 of two full lot futures contracts (labeled Hedge #102) for 10,000 bushels at the market price. After Hedge #102 is secured, the system recalculates the current value of the position counter by subtracting the number of bushels in the just-executed hedge from the value of the position counter just before the hedge. Hence, the new value for the position counter (P), after the Hedge #102 is secured, and as shown in FIG. 3, is +1000 bushels (11,000 bushels–10,000 bushels). The system also recalculates the value of the wait counter (W), reflected in the far right column of FIG. 3. When the mode of operation setting requires waiting for a corresponding hedge to be secured before purchasing the bushels in any offer, the new value for the wait counter (W) will always be equal to the value of the position counter (P), if the value of the position counter (P) is positive. However, the new value of the wait counter (W) will always be zero if the value of the position counter (P) is a negative number.

Figure 4:
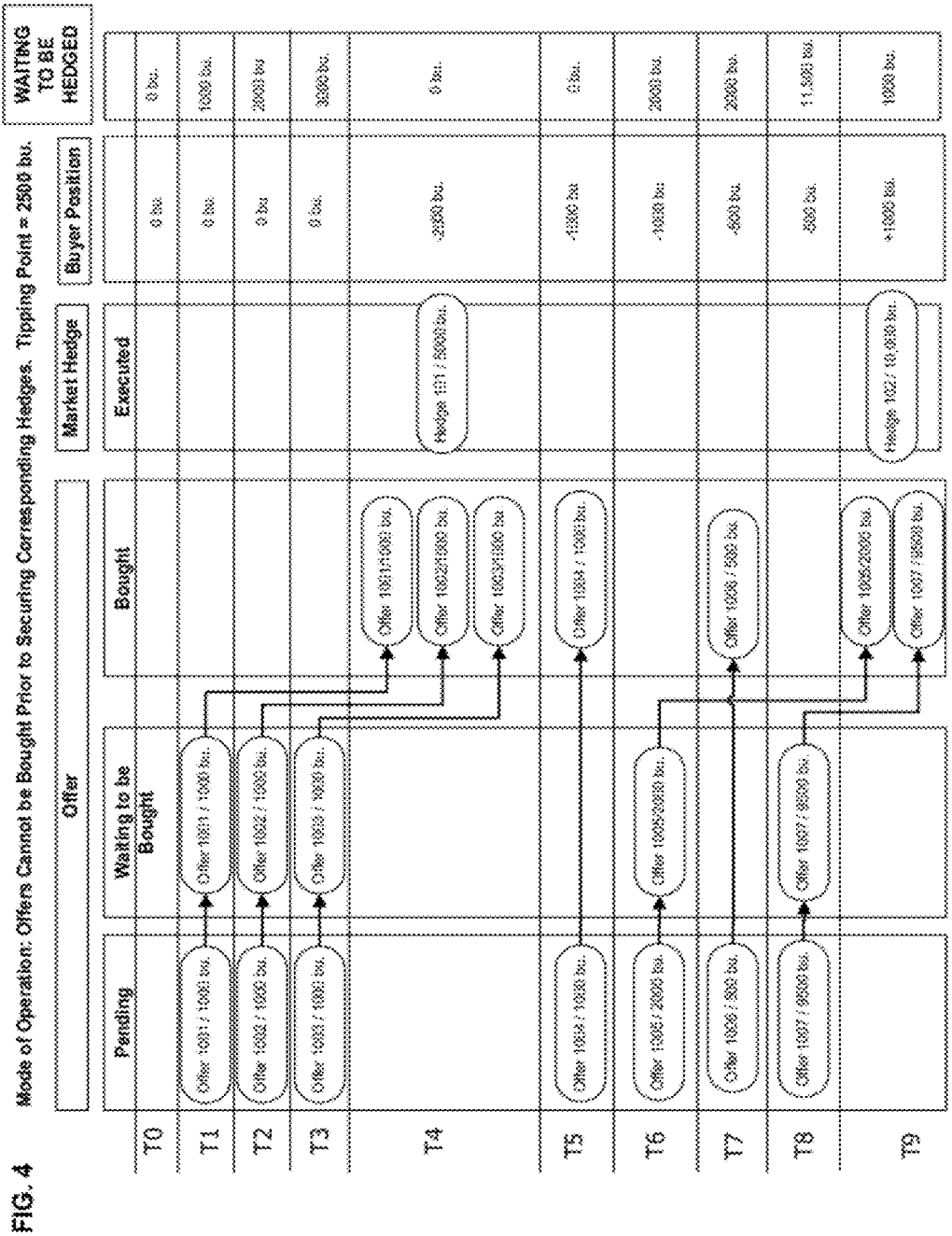
FIG. 4 shows a timing diagram illustrating how offers are handled in an embodiment of the invention, wherein the mode of operation is set so that offers cannot be bought prior to securing corresponding futures contracts (hedges) for the offers. In the diagram, it is shown that, in this mode, offers without corresponding hedges are first put into a "wait" state, where they must wait until the corresponding hedges are secured before they can be moved into a "bought" state.

FIG. 4 shows a timing diagram illustrating how offers are handled in one embodiment of the invention, when the mode of operation is set so that offers cannot be bought prior to securing corresponding futures contracts (hedges) for the offers. In the diagram of FIG. 4, it is shown that, in this mode, offers without corresponding hedges are first put into a "waiting to be bought" state, where they must stay until the corresponding hedges are secured before they can be moved into the "bought" state. Thus, in accordance with this mode of operation, it is seen that when Offers 1001, 1002 and 1003 come into the system in time slots T1, T2 and T3, respectively, they are put into the "waiting to be bought" state (represented by the second column of FIG. 4), where they must stay until Hedge 101 for 5000 bushels occurs, which is triggered by the occurrence of Offer 1003, pushed the number of bushels waiting to be hedged (W) above the 2,500 bushel tipping point (T). Similarly, when Offers 1005 and 1007 arrive in time slots T6 and T8, respectively, they must also be put in the "waiting to be bought" state until enough odd lot offers are accepted to accumulate enough bushels to reach the tipping point in time slot T9. As shown in FIG. 4, the state of Offer 1006 is changed from pending to bought substantially immediately because, when Offer 1006 arrives, the bushels in it are already considered covered by Hedge 101. In alternative embodiments, the system may be configured to hedge offers in the order that they arrived.

FIG. 5 shows a high-level flow diagram illustrating the steps that may be performed by the odd lot hedging module in some embodiments of the present invention to process odd lot offers. As shown in FIG. 5, in the first steps, at steps 502 and 504, the odd lot hedging module checks to determine whether a new eligible offer has been received. In this context, an offer is eligible if it has already been matched with a buyer's bid by a matching module, such as matching module 246 in FIG. 2. If it is determined, at step 504, that no new eligible offer has been received, then the system simply loops back to step 502 in order to perform the same check on a periodic basis. Next, at step 506, the offer quantity, the symbol and the full lot size are retrieved from memory storage and used to populate some of the operational variables for the odd lot hedging module, including the working variables Q, which equals the quantity, S, which is set equal to the offer symbol, and F, which represents the full lot size of the symbol.

Next, at step 508, the system uses the "modulo" function with operands Q and F to determine whether the new offer comprises an odd lot. If the answer is no, then there is no more processing to do for this offer and control passes back to the loop in steps 502 and 504 to continue monitoring for new offers. Otherwise, if the answer is yes, then the processor will change the state of the offer to "pending," step 510, and then, in steps 512 and 514, retrieve information from the database in order to set or reset a number of important operational parameters for this buyer and this symbol. In particular, the system will set or reset T, M, P, H and W, where T equals the predetermined tipping point for executing a new hedge, M indicates the buyer's preferred mode of operation, P indicates the buyer's total position for symbol S, H is the buyer's total hedged quantity for symbol S, and W is the total quantity of bushels waiting to be hedged on behalf of the buyer for symbol S.

At Step 516, the processor determines by, checking the M variable, which mode of operation is in effect. If offers can be bought prior to securing a corresponding futures contract, then, as shown in step 518, the state of the offer is immediately changed from "pending" to "bought" and the position counter (P) is incremented by the number of bushels (Q) in the just bought offer, as was discussed above in the detailed description of FIG. 3. On the other hand, if the mode is set so that offers cannot be bought before a hedge is obtained, then the system next determines, at step 520, whether the buyer's current trading position, as represented by the position counter (P) is sufficiently greater than the sum of the offer's quantity (Q) and the buyer's total hedged quantity to hedge the offer without selling another futures contract. In other words, the system determines at step 520 whether, based on the buyer's current trading position, the buyer currently needs to buy at least Q more units of the commodity to help reduce his current shortfall on the commodity. If the answer is yes, then, in step 518, the system immediately buys the Q units of the commodity in the new offer, changes the state of the offer to bought, and increments the position counter P by Q.

If it is determined at step 520 that the buyer's position is not short enough to accommodate the Q bushels in the new offer, then the state of the offer is changed from "pending" to "waiting," step 522, and the bushels in the new offer (Q) are added to the bushels currently waiting to be hedged (W), step 524. Then, in step 526, the processor compares the number of bushels waiting to be hedged (W) to the predetermined tipping point (T), to determine whether the tipping point has been met or exceeded. If not, then the system is programmed to update the database for this buyer and this symbol by copying the adjusted values for the operating parameters P and W back into the proper places in the database. See step 528. On the other hand, if the predetermined tipping point T has been exceeded by the number of bushels of the commodity waiting to be hedged (W), then the system calculates the largest number of full contracts (N) in the total number of waiting bushels (W) using the formula:

$$N = \text{floor}((F-T+W)/F)$$

where,

N=the number of full lot futures contracts to include in the order,

F=the size of a full lot futures contract for the commodity,

T=the predetermined tipping point,

W=the total number of units of the commodity currently waiting to be hedged on behalf of the buyer, and the function "floor(x)" provides the largest real integer not greater than the real number x.

Next, at step 532 the system activates the programmatic interface to the futures contract service to automatically sell N full lot futures contracts on the commodity exchange at the market price. When N full lot futures contracts have been sold at the market price, the system changes the state all of the offers that are currently waiting to be bought to the "bought" state (see step 536). Then, at step 538, the operating parameters for this buyer and for this symbol are recalculated, and the database is updated with the new values of the operating parameters (steps 540 and 528). At this point, all of the processing for the new offer has been completed, and control passes back to steps 502 and 504, where the system monitors the database for new offers.

As shown in FIG. 2, some embodiments of the present invention provide a user interface module 252, comprising program instructions and code that are operable with the microprocessor 202, the customer database 205 and the server 230 to cause updates about the current status of the above-described automated odd lot trading and hedging functions to be periodically transmitted to the buyer trading devices 260 connected to the commodity trading system 201 through the data communications network 290 via network links 261, 263 and 291. The status updates, which may take the form of text, icons, graphic images, hyper text markup language (HTML) pages, tables or symbols, or some combination of text, icons, graphic images, HTML pages, table or symbols, are preferably designed to convey to a buyer her present overall position in respect to a plurality of different commodities, a plurality of bought or waiting offers, and a plurality of acquired and yet-to-be acquired cash contracts and futures contracts (hedges) corresponding to the plurality of commodities and offers. The status updates, which may be transmitted by the commodity trading system 201 using a variety of different data transmission techniques or protocols, including without limitation, web page service, email service and text messaging, may be displayed on human interface devices, such as display screens, monitors or printers (not shown in FIG. 2), that are embodied in or connected to buyer trading devices 260.

Figure 6:
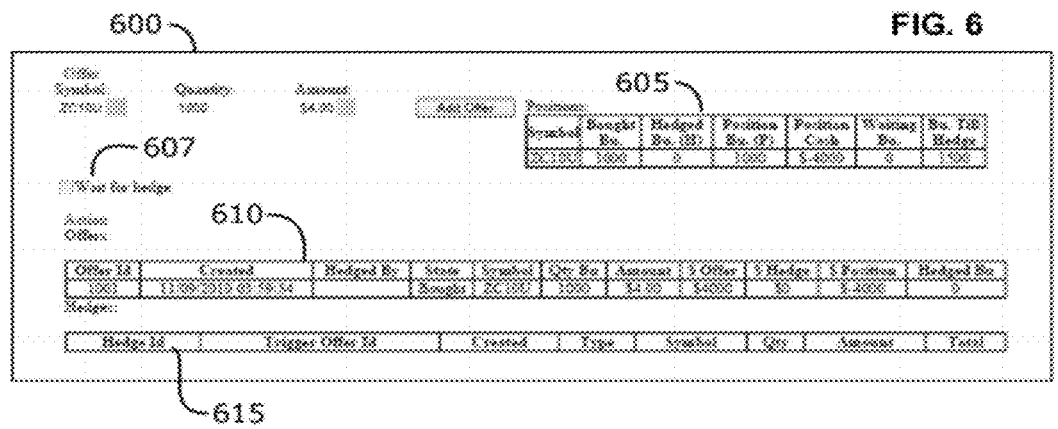

By way of example, FIGS. 6-33 illustrate a useful approach for conveying and displaying odd lot trading and hedging status update information to buyers according to one embodiment of the present invention. In this approach, commodity trading systems operating according to embodiments of the invention are configured to generate and transmit to the buyer trading system for display on a monitor, screen or printer a status page 600 comprising three tables, including a positions table 605, and offers table 610, and a hedges table 615, as shown in FIG. 6. Together, these three tables are configured to provide a snapshot of: (1) the buyer's current overall position in respect to a plurality of commodities (positions table 605), the current lot sizes, prices and hedging statuses of odd lot offers received by the buyer for the plurality of commodities (offer table 610), as well as the current lot sizes, prices and triggering offers for any offsetting futures contracts (hedges table 615) automatically secured by the system on behalf the buyer to offset the risks associated with the offers listed in the offers table 610 that are automatically purchased by the system on behalf of the buyer.

More particularly, the positions table 605 includes seven columns, denoting the commodity symbol, the number of bushels bought, the number of bushels hedged (H), the buyer's overall position for the commodity in bushels (corresponding to the variable "P" in the flow diagram of FIG. 5, discussed above), the buyer's overall cash position for the commodity, the number of bushels waiting to be hedged, and the number of bushels that must be bought before the next hedge will be triggered. The offers table 610 includes ten columns, denoting the offer identifier for each received offer, the time the offer was created, the identifier of the corresponding hedge for the offer, if any, the state of the offer, the symbol for the commodity in the offer, the quantity of the offer, the price per bushel for the offer, the total price for the offer, the value of the corresponding hedge for the offer and the number of bushels in the corresponding hedge for the offer, if any. The hedges table 615 comprises eight columns, denoting the hedge identifier, the identifier for the offer that triggered the hedge, the time the hedge was created, the hedge type, the commodity symbol for the hedge, the hedge quantity, the per bushel dollar value of the hedge and the total value of the hedge in dollars. In this example, the current mode of operation for this buyer is indicated in screenshot 600 with a switch 607 located above the offers table 610. It is understood that a variety of additional columns may be added to the above-described tables to provide additional information to the buyer, as desired, without departing from the scope of the present invention. Thus, the offer table 610 may be configured, for instance, to provide, for each offer, an identifier, name and/or location of the seller for each offer.

As will be explained in more detail immediately below, embodiments of the present invention may be configured to transmit a succession of snapshots (or, alternatively, a stream of data that may be formatted by the server or the buyer's trading device to depict a succession of snapshots), which, by virtue of the values in the position, offers and hedges tables, show buyers how some offers are immediately "bought" when the current values of the wait count, position count, hedge count and operating mode variables permit it, or otherwise put into a "waiting" state when these variables, in conjunction with calculations performed by the microprocessor of the system, dictate that the offers should not be bought until a corresponding hedge has been secured. In the discussion of the exemplary screenshots of FIGS. 6-33 that follows, a full lot size (corresponding to the variable "F" in the flow diagram of FIG. 5) is equal to 5,000 bushels and the tipping point (corresponding to the variable "T" in the flow diagram of FIG. 5) operating parameter is set to half that amount, or 2,500 bushels. It should also be understood that, for the following examples, all of the incoming offers have already been "matched" by the matching module and, therefore, marked as eligible for automatic purchasing on behalf of the buyer.

FIGS. 6-15 illustrate, by way of exemplary successive snapshots, the results of actions that may be taken by a commodity trading system operating according to an embodiment of the present invention, such as the commodity trading system 201 depicted in FIG. 2, when the system receives ten consecutive offers (designated offers 1001 through 1010) for September 2010 corn (identified with the commodity trading symbol ZC10U) between the times 03:59:34 and 04:13:27 on Nov. 9, 2010, while the mode of operation parameter for the system ("M" in the flow diagram of FIG. 5) is set to automatically purchase matched offers immediately upon receipt without waiting for a corresponding hedge to be acquired. In preferred embodiments, the mode of operation parameter (to wait, or not wait, before automatically purchasing odd lots from sellers on behalf of buyers), as well as the "tipping point" parameter, may be set independently by each buyer, and recorded in a set of buyer preferences records in the customer database, or alternatively, set by a system administrator to apply to all buyers on the system, reflected in and/or controlled by a set of system-wide operating parameters 248 stored in volatile memory 240.

Turning first to the screenshot 600 in FIG. 6, it is seen that, at time 03:59:34, the system receives an odd lot offer 1001 to sell 1000 bushels of ZC10U for $4 per bushel, or $4000. Since the mode of operation (M), as indicated by the deactivated switch 607, is set to immediately buy odd lot bushels without waiting until a corresponding hedge is acquired, and as indicated by the positions table 605 and the offers table 610 in screenshot 600, all 1000 bushels in the offer 1001 are immediately bought (i.e., put into the "bought" state) on behalf of the buyer, thereby resulting, as shown in the positions table 605, in a total bushel position for the buyer of +1000, a total cash position of −$4000. As shown by the last column of the positions table 605 of screenshot 600, after the 1000 bushes in offer 1001 have been bought, the system recognizes that it needs to receive and buy offers comprising at least 1,500 more bushels (i.e., the tipping point T minus the total bushels bought so far) before a futures contract will be sold to hedge the bushels already bought on behalf of this buyer. Thus, as shown by hedging table 615 in screenshot 600, no futures contracts are sold by the system as a result of receiving and buying the corn offered for sale in offer 1001.

Figure 7:
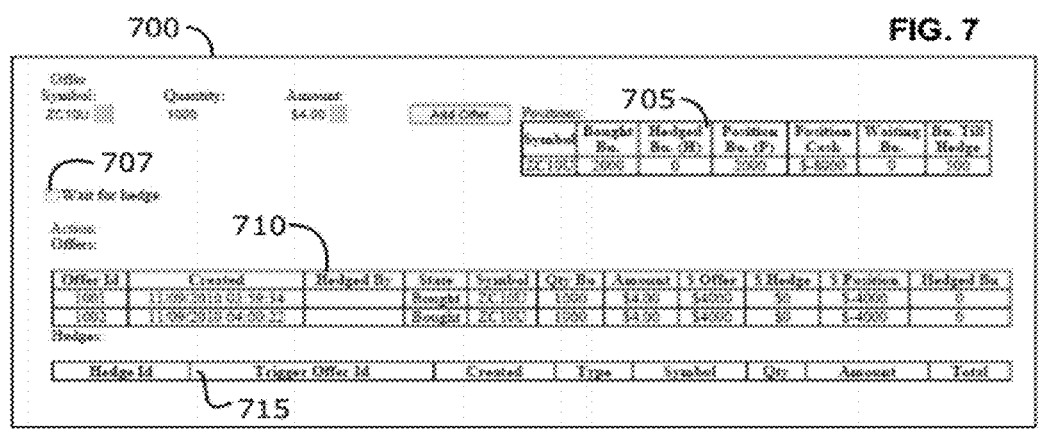

In screenshot 700 of FIG. 7, it is evident by the offers table 710 that, less than a full second after the system received odd lot offer 1001, the system receives a second odd lot offer 1002, also comprising an offer to sell 1000 bushels of ZC10U corn at $4 per bushel. Offer 1002 is also immediately accepted and bought on behalf of the buyer, as dictated by the fact that the mode of operation switch 707 is still deactivated (unchecked). As shown by the positions table 705 in screenshot 700, the buyer's total position in bushels is now +2,000 bushels (or the sum of odd lot offers 1001 and 1002), the buyer's total cash position with respect to ZC10U is −$8000, and the system still needs to receive and buy at least 500 more bushels of ZC10U on behalf of this buyer before a hedge will be triggered and sold on behalf of the buyer to offset the risk associated with all of the bushels the system has purchased for the buyer so far. Thus, as shown by the hedges table 715, the system still has not sold any futures contracts. In other words, at this point, the buyer is 2,000 bushels "long" on corn and $8,000 "short" on cash because the system has bought 2,000 more bushels of corn for this buyer than it has sold.

Figure 8:
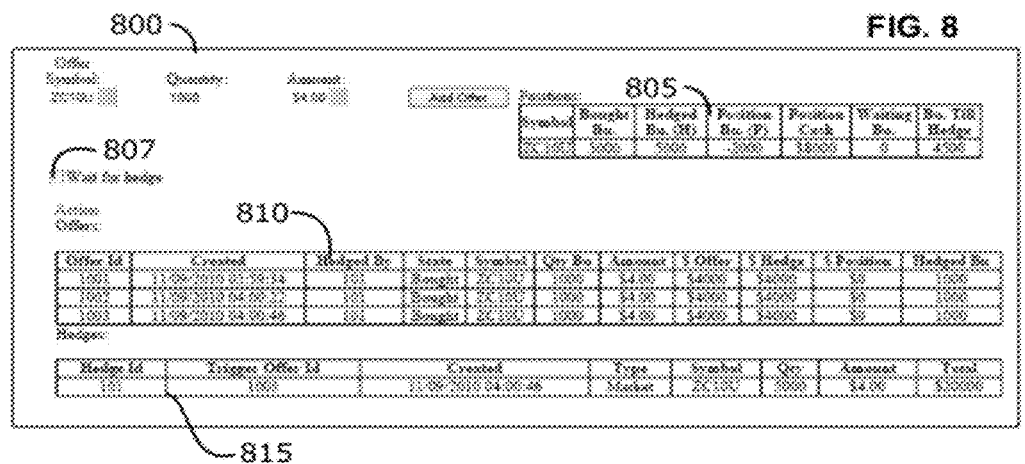
Figure 12:
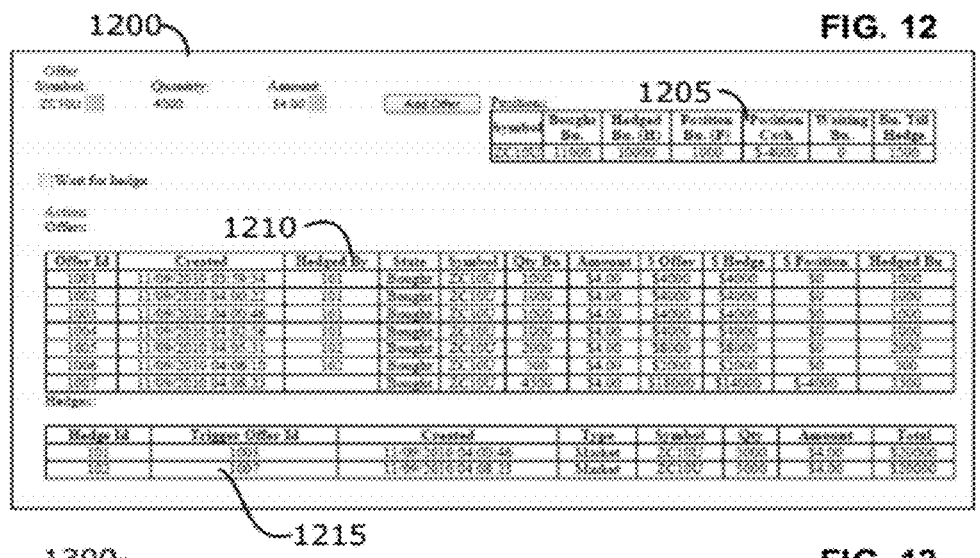
Figure 13:
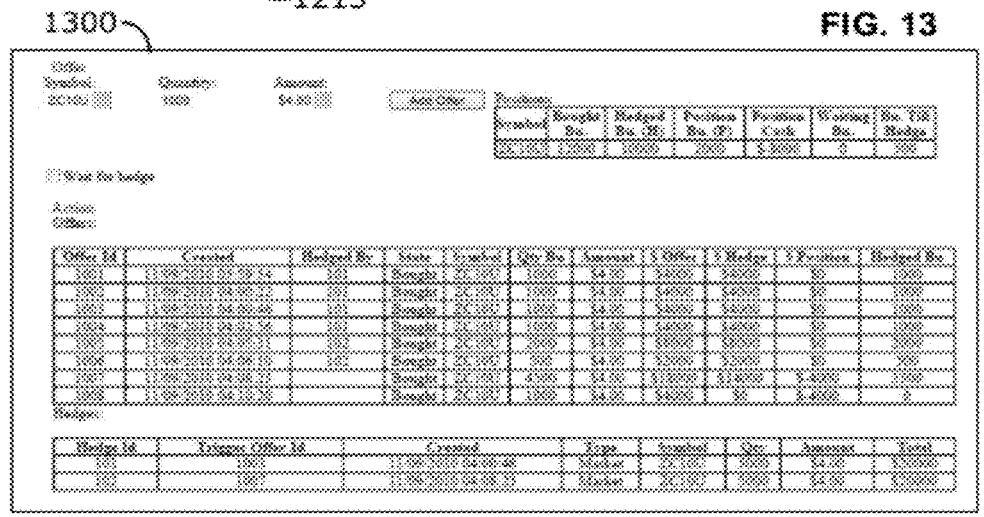

In screenshot 800 of FIG. 8, it is evident by the offers table 810 that, approximately $^{24}/_{100}$ths of a second after the system received and bought odd lot offer 1002, the system receives a third odd lot offer 1003, also comprising an offer to sell 1000 bushels of ZC10U corn at $4 per bushel. Just like odd lot offers 1001 and 1002, and as dictated by the fact that the mode of operation switch 807 is still deactivated (unchecked), odd lot offer 1003 is also immediately accepted and bought on behalf of the buyer. However, the addition of 1,000 additional bushels of ZC10U corn to the total number of bushels now waiting to be hedged triggers a sale on behalf of the buyer of a full lot futures contract 101 for 5,000 bushels, as indicated by the value in hedging table 815. The first 3,000 bushels of the 5,000 bushel full lot futures contract are used to offset the risk for the 3,000 bushels bought on behalf of the buyer when odd lot offers 1001, 1002 and 1003 were accepted and bought, thereby resulting in the buyer's position being 2,000 bushels short on corn and $8,000 long on cash. This is because the system has now sold 2,000 more bushels of ZC10U corn on behalf of the buyer than it has bought. Accordingly, as shown by the positions table 805 in screenshot 800, the buyer's total position in bushels is now shown as −2,000 bushels, the buyer's total cash position with respect to ZC10U is +$8000, and the system now needs to receive and buy at least 4,500 more bushels of ZC10U on behalf of this buyer before the next futures contract (hedge) will be triggered and sold on behalf of the buyer (i.e., the sum of the current shortfall and the tipping point T parameter set for the system).

Figures 9, 10, 11:
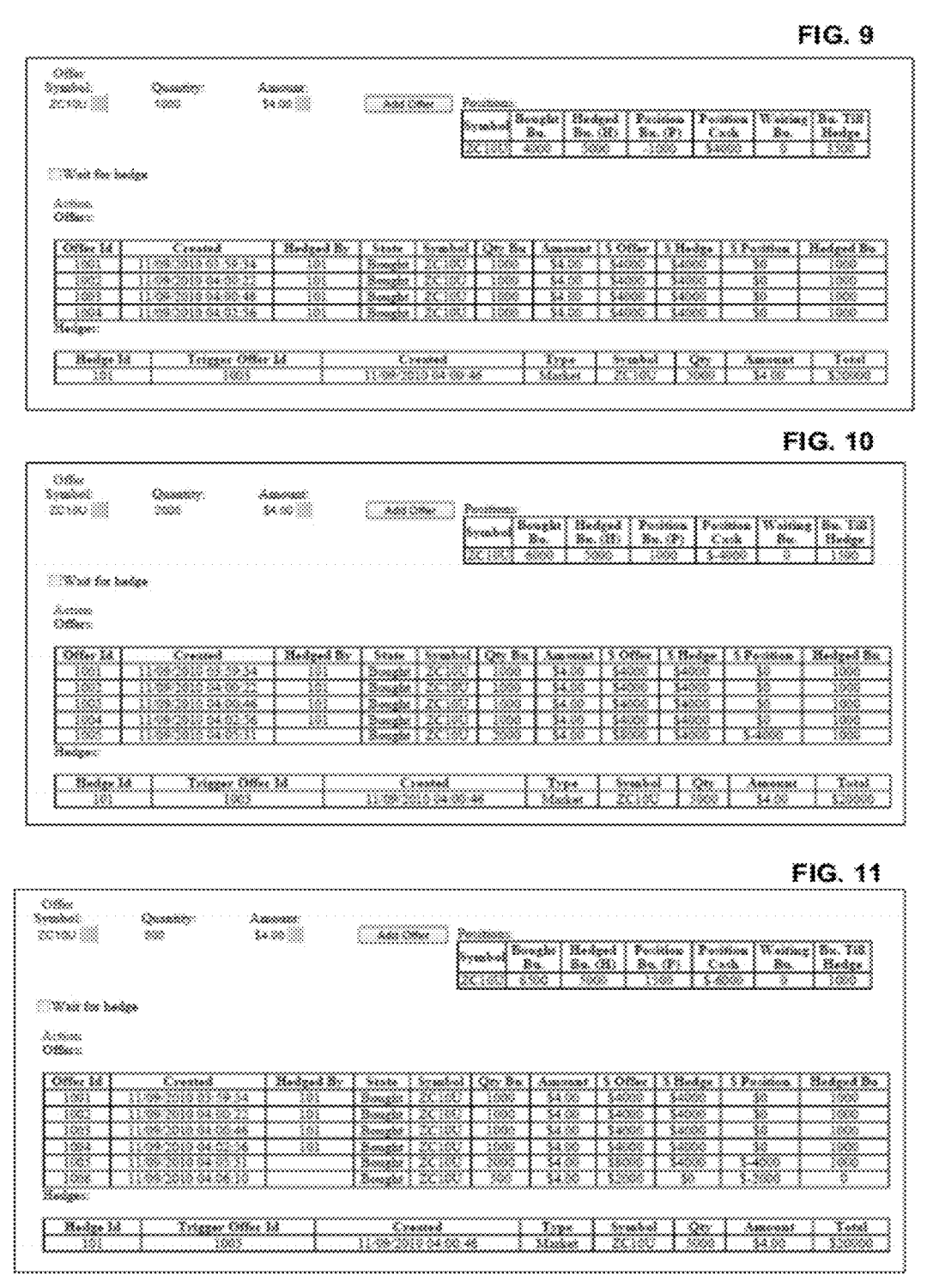

As illustrated by the screenshots in FIGS. 9, 10 and 11, when odd lot offers 1004, 1005 and 1006, totaling 3,500 bushels of ZC10U corn are received, they are all immediately bought by the system on behalf of the buyer without triggering another hedge because the total number of bushels in odd lot offers 1004, 1005 and 1006 is less than the sum of the shortfall and the tipping point T. However, when the system receives odd lot offer 1007 for 4,500 bushels, as illustrated by the offer table 1210 and the hedges table 1215 in screenshot 1200 of FIG. 12, a second full lot futures contract (hedge) 102 for 5000 bushels is triggered and sold, and used to offset the risk associated with buying all of the bushels in odd lot offers 1005 and 1006, and the first 1,000 bushels of odd lot offer 1007. None of the bushels in full lot hedge 102 were needed to cover the 1,000 bushels in offer 1004 because the odd lot bushels bought in odd lot offer 1004 were already covered by the 2,000 extra bushels of full lot hedge 101 that were not needed to cover odd lot offers 1001, 1002 and 1003.

Figure 14:
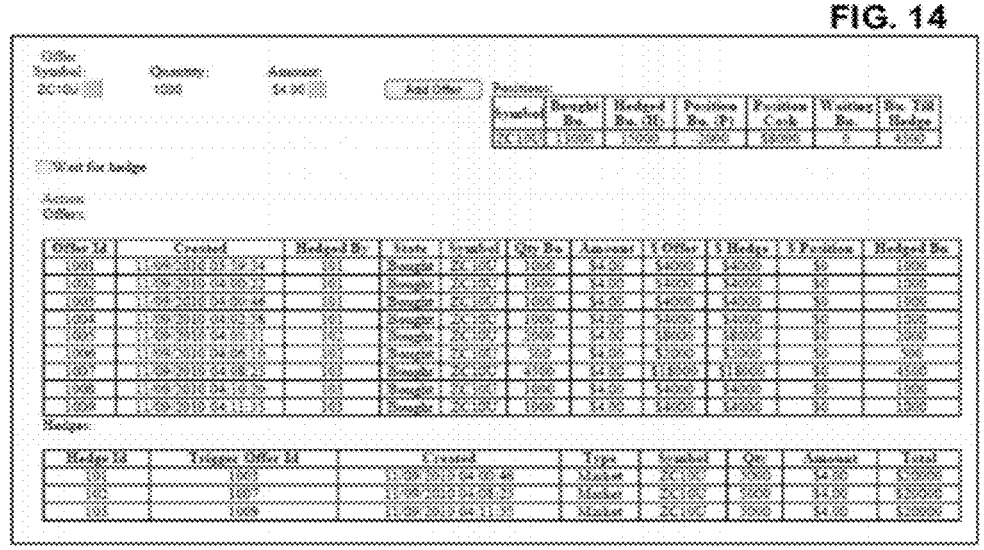

Notably, when it is necessary, preferred embodiments of the present invention are capable of using multiple hedges to offset the risk of buying all of the bushels in a single offer. As shown in the screenshots 1200 and 1300 of FIGS. 12 and 13, for instance, full lot hedge 102 only covers the first 3,500 bushels of odd lot offer 1007. Therefore, all 4,500 bushels of odd lot offer 1007 are not fully hedged until the system receives and buys odd lot offer 1009, which triggers the sale of a third full lot hedge 103, as shown in FIG. 14, which bushels are used to offset all of the previously un-hedged bushels bought with the acceptance of odd lot offers 1007, 1008 and 1009.

Figures 15, 16:
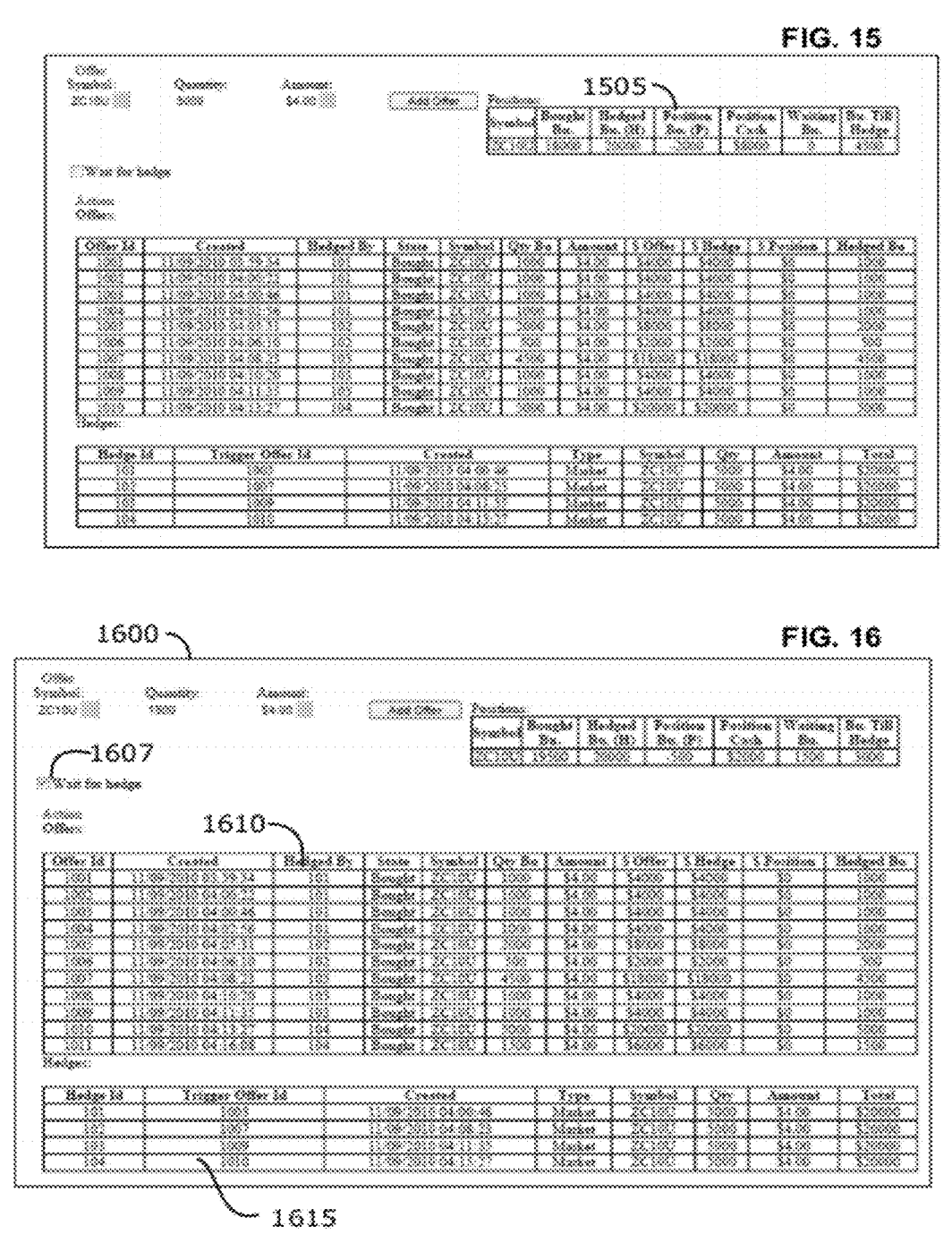

In FIGS. 15 and 16, it can be seen that a fourth full lot hedge 104 is triggered and acquired when the system receives and immediately buys all 5,000 of the bushels in odd lot offer 1010. Full lot hedge 104 is then used to offset the risk associated with immediately accepting and purchasing odd lot offers 1010 and 1011. In FIG. 16, however, switch 1607 has been activated to change the mode of operation from the "no waiting" mode to the "waiting" mode, so that the system will not accept or buy any offers unless and until the system has already acquired sufficient hedges to offset the bushels in those offers. Even though the mode of operation is set to "waiting," odd lot offer 1011 for 1,500 bushels is still bought immediately on the buyer's behalf because, as shown in the positions table 1505 of FIG. 15, the buyer was short 2,000 after the full lot hedge 104 was acquired. Therefore, the entire 1,500 bushels of odd lot offer 1011 could be bought and covered by the extra bushels in full lot hedge 104 that were not required to cover the 5,000 bushels bought in offer 1010.

Figure 17:
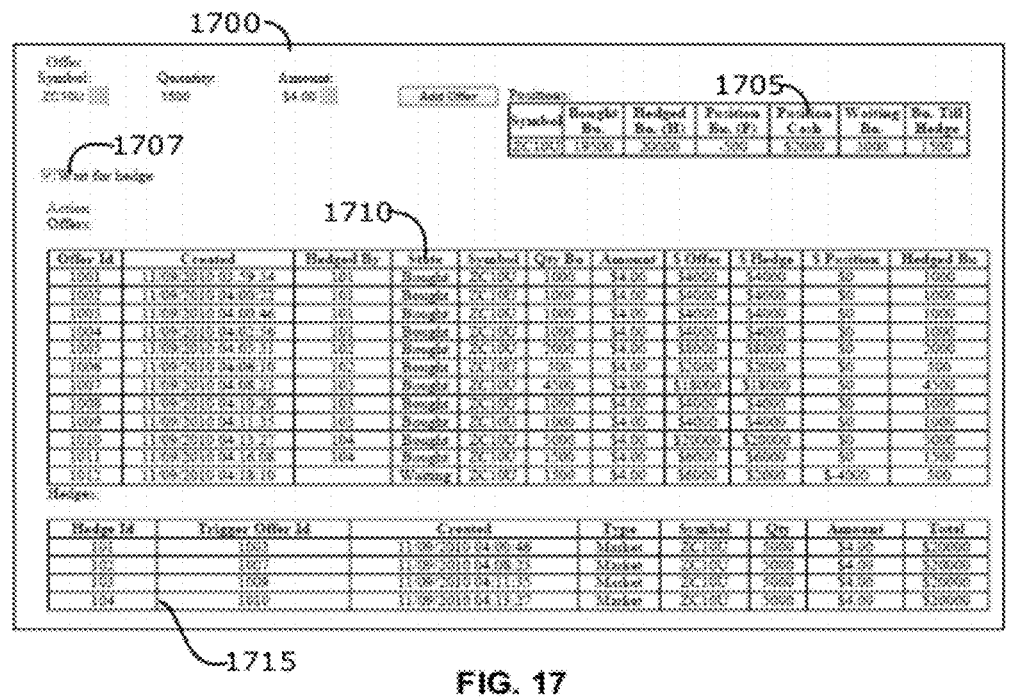
Figure 18:
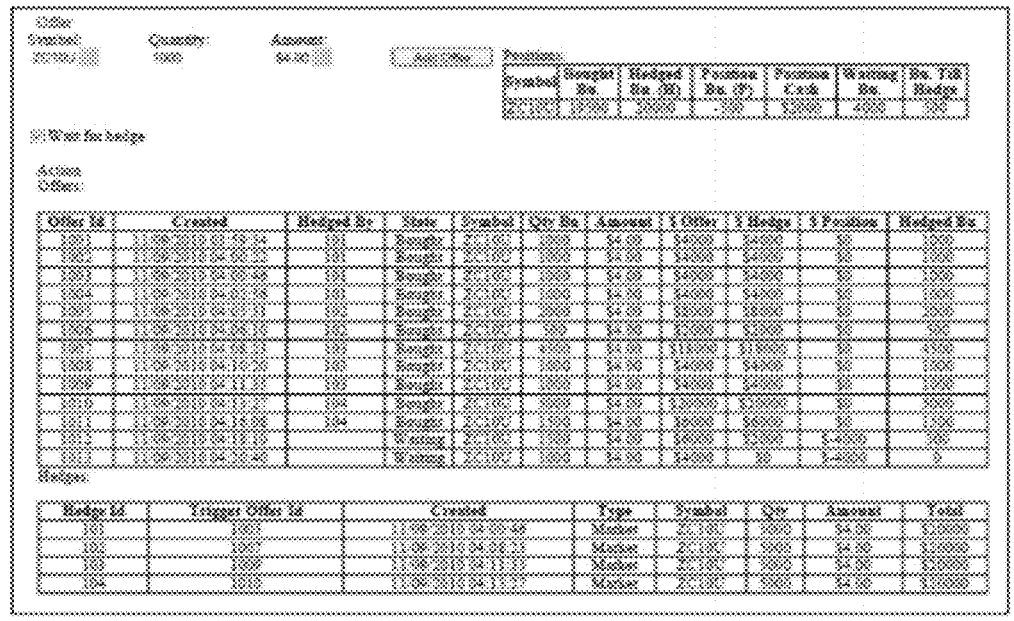
Figure 19:
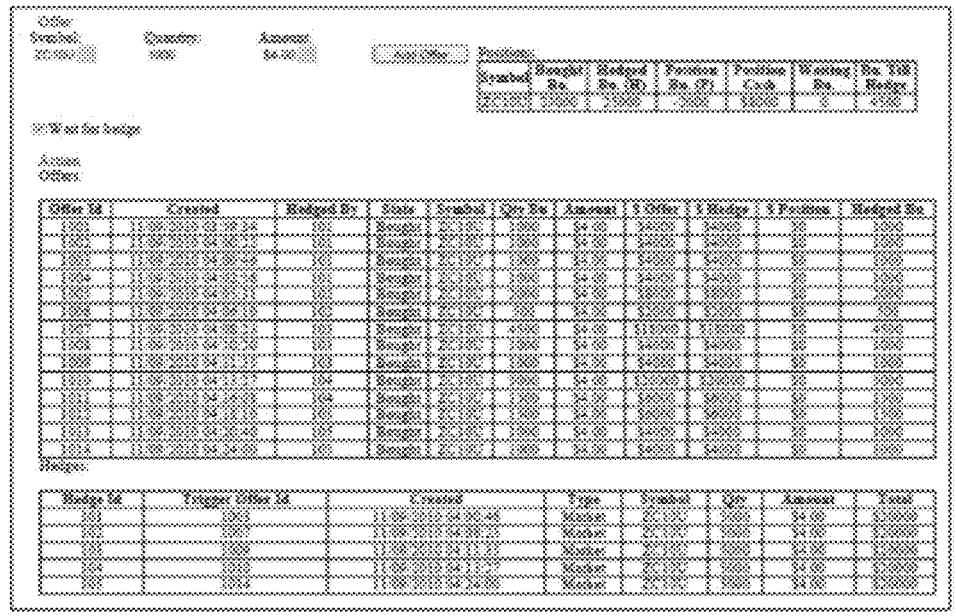
Figure 20:
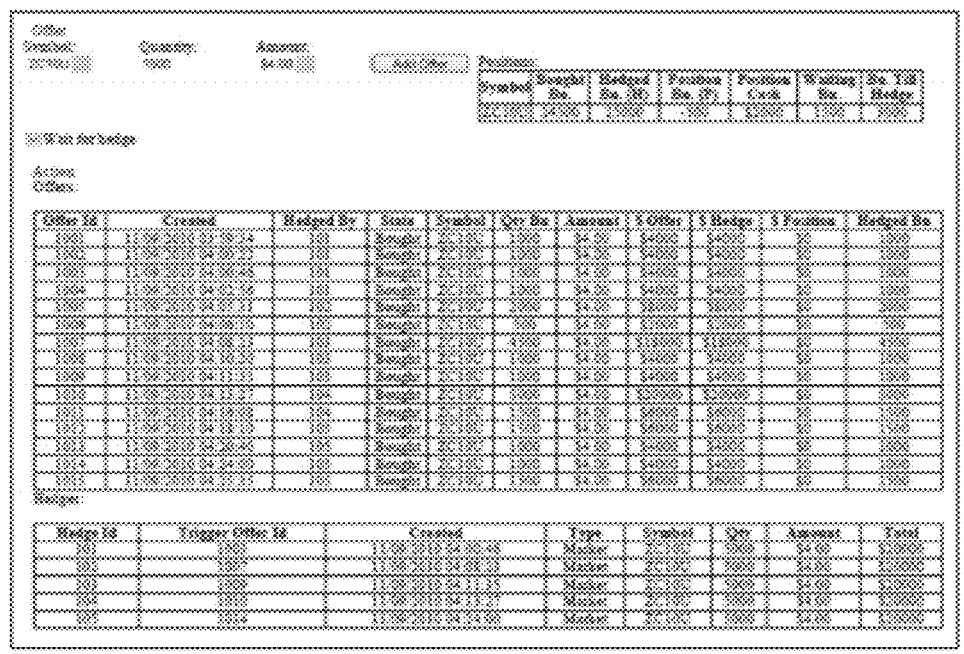
Figures 21, 22:
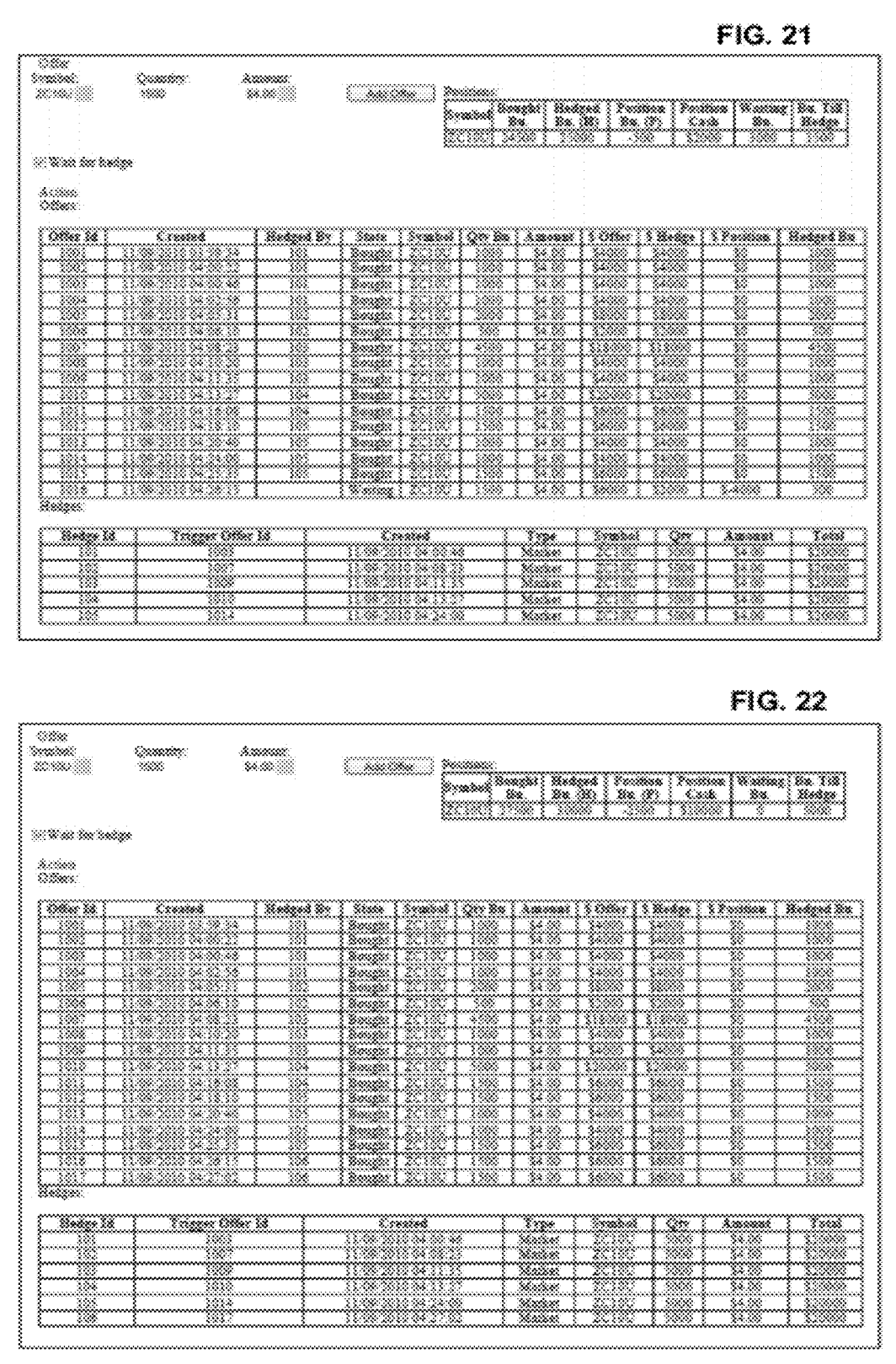
Figures 23, 24:
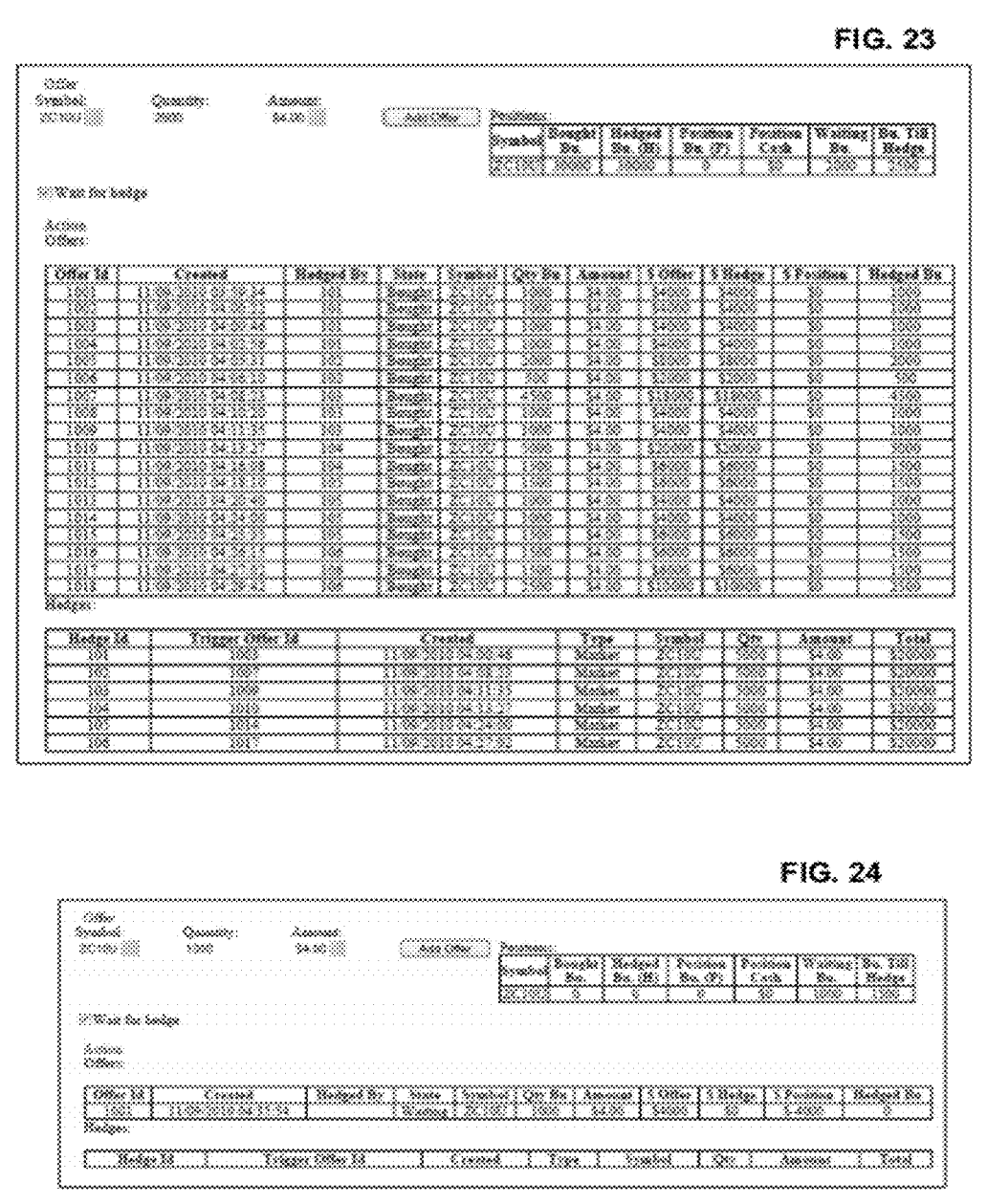

FIGS. 17, 18, 19 and 20 illustrate, by way of example, what happens when the mode of operation is set to "wait" and a sufficient number of bushels have not be sold in the futures market to offset the quantity of bushels in incoming offers. As shown in FIGS. 17 and 18, odd lot offers 1012 and 1013 are not immediately bought like all of the previous odd lot offers. Instead, odd lot offers 1012 and 1013 are put into a "waiting" state until the system receives odd lot offer 1014, which triggers a fifth hedge 105 for 5,000 bushels, which bushels are then used to hedge all of the bushels in odd lot offers 1012-1015, thereby permitting the system to accept offers 1012-1015 for purchase. Similarly, as shown in the screenshots of FIGS. 21, 22 and 23, when odd lot offer 1016 is received it is first put into a waiting state, and not bought, until odd lot offer 1017 is received and triggers hedge 106, whose bushels are then used to hedge all of the bushels in odd lot offers 1016 through 1018.

Figures 28, 29, 30:
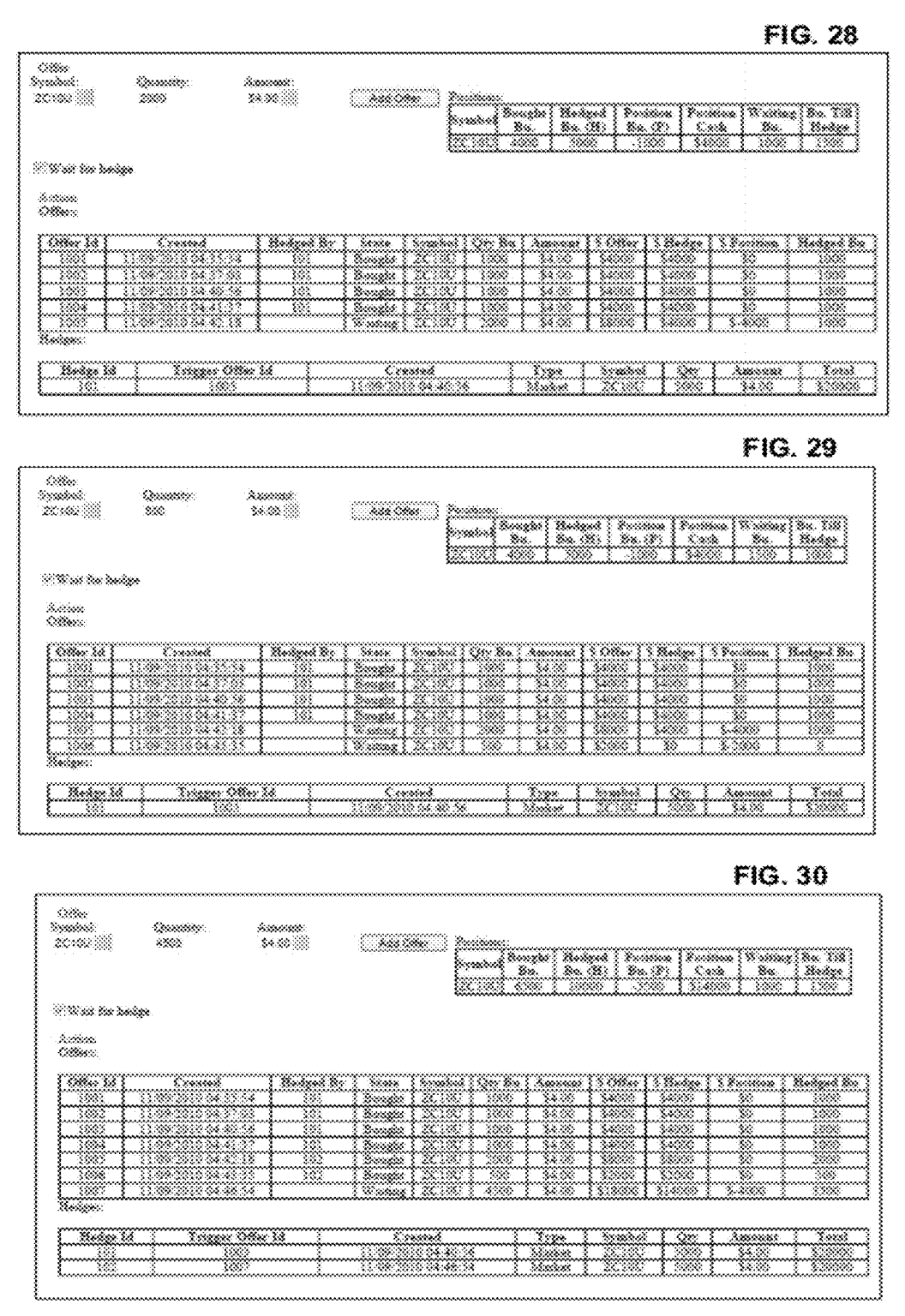
Figures 31, 32:
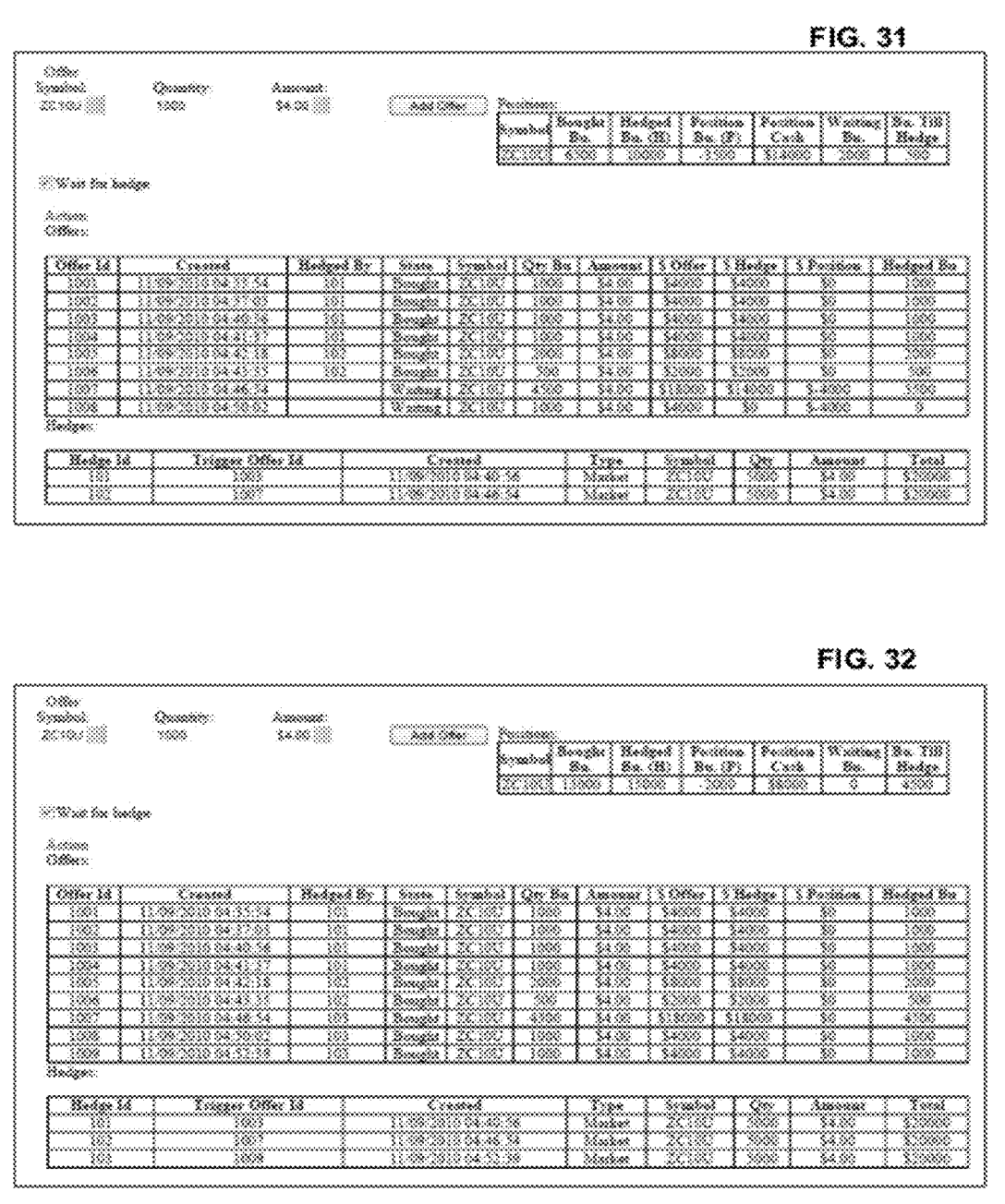
Figure 33:
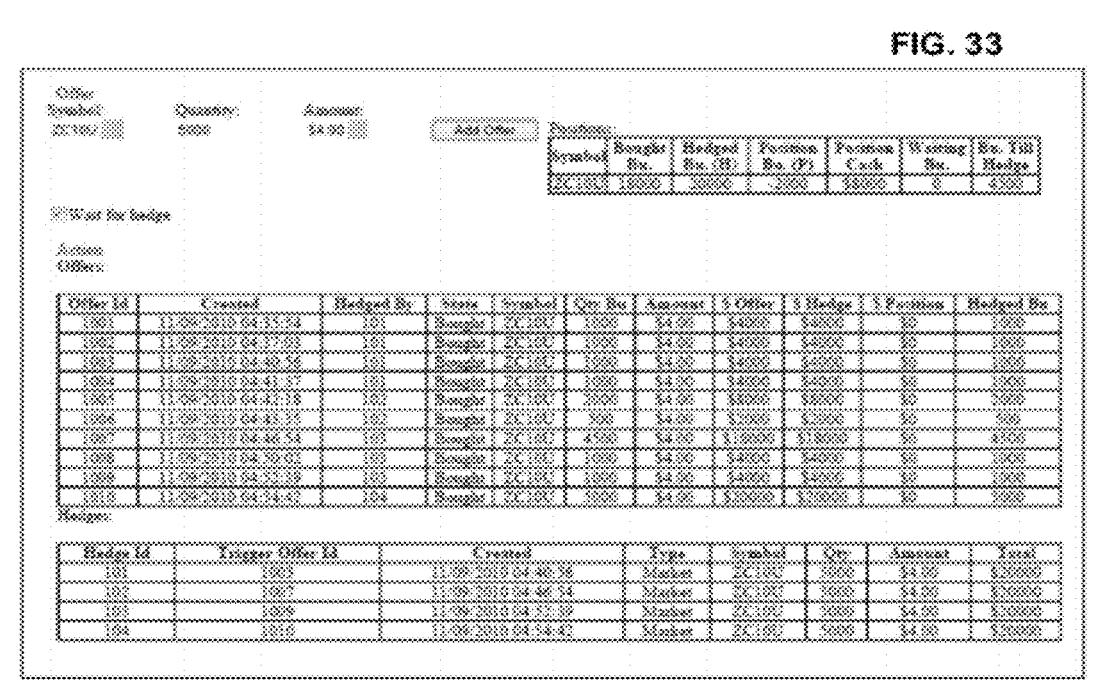

FIGS. 24-33 illustrate what would have occurred if the mode of operation switch had been activated when offers 1001 through 1010 were received, which would have caused the system to put all incoming odd lot offers into the "waiting" state unless and until a sufficient number of bushels were sold in the futures market to offset the associated risk. In this mode of operation, and as shown by FIGS. 24-27, odd lot offers 1001 and 1002 are not bought immediately. Instead, they are put into the "waiting" state until offer 1003 is received and triggers hedge 101, which would then be used to cover all of the bushels in odd lot offers 1001 through 1004, thereby permitting the system to change the state of odd lot offers 1001 through 1004 to bought. Similarly, as shown in FIGS. 28-32, odd lot offers 1005 and 1006 are put into the "waiting" state until odd lot offer 1007 is received and triggers hedge 102, and odd lot offers 1007 and 1008 are put in a "waiting" state until the odd lot offer 1009 is received and triggers hedge 103. Here, as shown in FIG. 29, Offer 1006 is made to wait, even though the size of Offer 1006 could have been covered by Hedge 101. Whether offers small enough to be covered by a previous hedge are immediately bought, or made to wait in line until previously-received offers are bought, is an implementation choice of the buyer or the commodity system operator. Finally, as shown in FIG. 33, odd lot offer 1010 triggers hedge 104, which permits the system to immediately buy the bushels in odd lot offer 1010 without first putting odd lot offer 1010 into the waiting state.

Although the exemplary embodiments, uses and advantages of the invention have been disclosed above with a certain degree of particularity, it will be apparent to those skilled in the art upon consideration of this specification and practice of the invention as disclosed herein that alterations and modifications can be made without departing from the spirit or the scope of the invention, which are intended to be limited only by the following claims and equivalents thereof

What is claimed is:

1. An apparatus for trading commodities, comprising:
   (a) a microprocessor;
   (b) a memory;
   (c) a database in the memory, the database having a field that stores a wait counter W indicating a total number of units of the commodity currently waiting to be hedged on behalf of a buyer;
   (d) a user-specified tipping point T in the memory indicating a minimum number of units of the commodity that must currently be waiting to be hedged before a request to sell a full lot futures contract for the commodity can be executed on behalf of the buyer, the tipping point T being a value that is greater than zero and less than a full lot size;
(e) a server that receives and stores in the database an offer from a seller to sell a quantity Q of the commodity to the buyer, wherein the quantity Q comprises an odd lot size;
(f) an interface to a futures contract service, the futures contract service being configured automatically sell one or more full lot futures contracts for said commodity; and
(g) an odd lot hedging module, in the memory, having program instructions that, when executed by the microprocessor, cause the microprocessor to automatically invoke the interface to sell said one or more full lot futures contracts, at a market price, when the sum of said wait counter W and said quantity Q is greater than or equal to the tipping point T.

2. The apparatus of claim 1, wherein the program instructions in the odd lot hedging module cause the microprocessor to automatically invoke the interface to sell N full lot futures contracts when the sum of said wait counter W and said quantity Q is greater than or equal to the tipping point T.

3. The apparatus of claim 1, wherein the program instructions in the odd lot hedging module are arranged to prevent the microprocessor from invoking the interface to sell the one or more full lot futures contracts while the sum of said wait counter W and said quantity Q is less than the tipping point T.

4. The apparatus of claim 1, further comprising:
(h) a full lot size F, stored in the memory, indicating the size of a full lot futures contract for the commodity;
(i) wherein the program instructions in the odd lot hedging module cause the microprocessor to automatically calculate a number N of full lot futures contracts to sell according to the formula $$N=\text{floor}((F-T+W)/F).$$

5. The apparatus of claim 1, wherein
the database further includes a field for storing a position counter P indicating the buyer's current trading position for the commodity; and
the program instructions in the odd lot hedging module are configured to cause the microprocessor to invoke the interface to sell said N futures contracts based at least in part on the value of position counter P.

6. The apparatus of claim 5, wherein
the database further includes a field that stores a hedge counter H indicating a total number of odd lot units of the commodity currently hedged on behalf of the buyer; and
the program instructions in the odd lot hedging module are further configured to cause the microprocessor to invoke the interface to sell said N full lot futures contracts based at least in part on the current value of the hedge counter H.

7. The apparatus of claim 6, wherein
the database further includes a field that stores a mode of operation M indicating whether offers to sell the commodity to the buyer may be accepted on behalf of the buyer prior to securing a sufficient number of futures contracts to hedge the offers;
the odd lot hedging module includes program instructions that, when executed by the microprocessor, cause the microprocessor to determine whether a sufficient number of futures contracts have been secured to hedge the quantity Q in the offer based on the current values of the position counter P, the hedge counter H and the quantity Q; and
the program instructions in the odd lot hedging module will not permit the microprocessor to accept the offer until: (i) the sufficient number of futures contracts have been secured to hedge the quantity Q, or (ii) the current value of the mode of operation M indicates that offers can be accepted on behalf of the buyer prior to securing the sufficient number of futures contracts to hedge the offers.

8. The apparatus of claim 7, wherein the odd lot hedging module further includes program instructions that, when executed by the microprocessor, cause the microprocessor to calculate new values for the wait counter W, the position counter P and the hedge counter H based on the order having been executed by the futures contract service, and store the new values in the corresponding fields of the database.

9. The apparatus of claim 7, wherein:
the database further includes a field for storing an offer state indicating whether the offer is currently waiting to be hedged or currently bought; and
the odd lot hedging module further comprises program instructions that, when executed by the microprocessor, cause the microprocessor to:
(i) compare the value of the position counter P to the sum of the quantity Q and the hedge counter H
(ii) when the position counter P is less than the sum of the additional units Q and the hedge counter H, set the value of the offer state field to indicate that the offer is currently waiting to be hedged, and
(iii) when the position counter P is greater than or equal to the sum of the additional units Q and the hedge counter H, set the value of the offer state field to indicate that the offer is currently bought.

10. The apparatus of claim 1, further comprising:
(h) a price feed interface that repetitively receives an updated commodity exchange price for the commodity;
(i) a trade eligibility field in the database for storing a value indicating whether the offer is eligible for a trade; and
(j) a matching module having program instructions that, when executed by the processor, causes the microprocessor to (i) calculate a cash price for the buyer based on a change to the updated commodity exchange price received via the price feed interface, and (ii) set the trade eligibility field in the database to indicate that the offer is eligible for a trade when the calculated cash price for the buyer is equal to the offer price;
wherein the odd lot hedging module further comprises program instructions that, when executed by the microprocessor, will not permit the microprocessor to invoke the interface to sell a futures contract corresponding to the odd lot quantity Q in the offer unless the trade eligibility field indicates the offer is eligible for a trade.

11. The apparatus of claim 10, wherein
the web server receives and stores in the database a bid from the buyer to buy the commodity, said bid including a buyer basis; and
the program instructions in the matching module cause the microprocessor to calculate the cash price for the buyer by adding the buyer basis received from the buyer to the updated commodity exchange price received via the price feed interface.

12. A method for trading commodities using a microprocessor, a memory, a database in the memory, and an interface to a futures contract service configured to automatically sell one or more full lot futures contracts for said commodity, the method comprising:

(a) storing in the database a wait counter W indicating a total number of units of the commodity currently waiting to be hedged on behalf of a buyer;

(b) storing in the memory a user-specified tipping point T indicating a minimum number of units of the commodity that must currently be waiting to be hedged before a request to sell one or more full lot futures contract for the commodity can be executed on behalf of the buyer, the tipping point T being a value that is greater than zero and less than a full lot size;

(c) receiving and storing in the database an offer from a seller to sell a quantity Q of the commodity to the buyer, wherein the quantity Q comprises an odd lot size; and (d) executing program instructions on the microprocessor to cause the microprocessor to automatically invoke the interface to sell said one or more full lot futures contract, at a market price, when the sum of said wait counter W and said quantity Q is greater than or equal to the tipping point T.

13. The method of claim 12, further comprising executing program instructions on the microprocessor to cause the microprocessor to determine the number N of full lot futures contracts to sell.

14. The method of claim 13, further comprising executing program instructions by the microprocessor that cause the microprocessor to automatically calculate a number N of full lot futures contracts to sell according to the formula $$N=\text{floor}((F-T+W)/F).$$

15. An apparatus for trading commodities, comprising:
(a) a microprocessor;
(b) a memory;
(c) a database in the memory having fields that store a wait counter W for a buyer, the wait counter W indicating a total number of units of the commodity currently waiting to be hedged on behalf of the buyer, a hedge counter H for the buyer, the hedge counter H indicating a total number of units of the commodity currently hedged for the buyer, and a position counter P for the buyer, the position counter P indicating the buyer's current trading position for the commodity;
(d) a user-specified tipping point T in the memory indicating a minimum number of units of the commodity that must be in a waiting state for the buyer before a request to sell a full lot futures contract for the commodity can be executed on behalf of the buyer, the tipping point T being a value that is greater than zero and less than a full lot size;
(e) a customer interface that permits electronic communication with a buyer trading device and a seller trading device;
(f) a web server that receives and stores in the database a bid received from the buyer trading device, via the customer interface, to buy additional units of the commodity, and an offer received from the seller trading device, via the customer interface, to sell additional units of the commodity to the buyer, said bid having a buyer basis, and said offer having an offer price and an odd lot size Q;
(g) a price feed interface that repetitively receives an updated commodity exchange price for the commodity;
(h) an electronic interface to a futures contract service configured to automatically sell one or more full lot futures contracts for the commodity, at a market price; and
(i) a set of program modules in the memory, comprising
(1) a matching module having program instructions that, when executed by the processor, causes the microprocessor to (i) calculate a cash price for the buyer each time the updated commodity exchange price received over the price feed changes in value by adding the buyer basis in the buyer's bid to the updated commodity exchange price, and (ii) mark the offer as eligible for a trade when the calculated cash price for the buyer is equal to the offer price, and
(2) an odd lot hedging module having program instructions that, when executed by the microprocessor, causes the microprocessor to invoke the futures contract service to sell a number N of full lot futures contracts when the sum of the odd lot size Q and the wait counter W is equal to or greater than the tipping point T.

16. The apparatus of claim 15, wherein the odd lot hedging module further comprises:
a full lot size F, stored in the memory, indicating the size of a full lot futures contract for the commodity; and
program instructions configured to cause the microprocessor to automatically calculate said number N of full lot futures contracts to sell according to the formula:

$$N=\text{floor}((F-T+W)/F).$$

17. A method for trading commodities using a microprocessor, a memory and a customer database, comprising:
(a) storing in the database a wait counter W for a buyer, the wait counter W indicating a total number of units of the commodity currently waiting to be hedged on behalf of the buyer, a hedge counter H for the buyer, the hedge counter H indicating a total number of units of the commodity currently hedged for the buyer, and a position counter P for the buyer, the position counter P indicating the buyer's current trading position for the commodity;
(b) storing in the memory a full lot size F indicating the size in units of a full lot futures contract for the commodity, and a user-specified tipping point T indicating a minimum number of units of the commodity that must be in a waiting state for the buyer before a request to sell a full lot futures contract for the commodity can be executed on behalf of the buyer, the tipping point T being a value that is greater than zero and less than a full lot size;
(c) establishing customer communications channel that permits electronic communication with a buyer trading device and a seller trading device;
(d) receiving and storing in the database a bid received from the buyer trading device, via the customer interface, to buy additional units of the commodity, and an offer received from the seller trading device, via the customer interface, to sell additional units of the commodity to the buyer, said bid having a buyer basis, and said offer having an offer price and an odd lot size Q;
(e) repetitively receiving an updated commodity exchange price for the commodity;
(f) establishing an electronic interface to a futures contract service configured to automatically sell a full lot futures contract for the commodity; and
(g) executing program instructions on the microprocessor to cause the microprocessor to
(1) automatically calculate a cash price for the buyer based on a change in the updated commodity exchange price by adding the buyer basis in the buyer's bid to the updated commodity exchange price,
(2) automatically mark the offer as eligible for a trade when the calculated cash price for the buyer is equal to the offer price,
(3) automatically calculate a number N of full lot futures contracts to sell based on current values for the tipping point T, the wait counter W, the hedge counter H and the position counter P, and (4) automatically invoke the interface to sell N full lot futures contracts at a market price when the sum of the odd lot size Q and the wait counter W is equal to or greater than the tipping point T, and (5) after the N full lot futures contracts are sold, automatically modifying the database to update the position counter P, the wait counter W and the hedge counter H.

18. The method of claim 17, executing program instructions by the microprocessor to cause the microprocessor to:

store the size F of a full lot futures contract for the commodity in the memory; and automatically calculate said N number of full lot futures contracts according to the formula:

$$N=\text{floor}((F-T+W)/F).$$

19. A non-transitory computer-readable storage medium with an executable program stored thereon, wherein the program includes instructions configured to cause a microprocessor to perform the following steps:

(a) storing in a database a wait counter W indicating a total number of units of the commodity currently waiting to be hedged on behalf of a buyer;

(b) storing in a memory a user-specified tipping point T indicating a minimum number of units of the commodity that must currently be waiting to be hedged before a request to sell one or more full lot futures contract for the commodity can be executed on behalf of the buyer, the tipping point T being a value that is greater than zero and less than a full lot size;

(c) receiving and storing in the database an offer from a seller to sell a quantity Q of the commodity to the buyer, wherein the quantity Q comprises an odd lot size; and (d) invoking an interface to a futures contract service to sell said one or more full lot futures contracts, at a market price, when the sum of said wait counter W and said quantity Q is greater than or equal to the tipping point T.

20. The non-transitory computer-readable storage medium of claim 19, wherein the program further includes instructions configured to cause the microprocessor to determine a number N of full lot futures contracts to sell.

21. The non-transitory computer-readable storage medium of claim 20, wherein the program further includes instructions configured to cause the microprocessor to calculate said number N of full lot futures contracts to sell according to the formula $$N=\text{floor}((F-T+W)/F).$$

22. The apparatus of claim 1, wherein the tipping point T has a value that is equal to about half of the size of a full lot.

23. The method of claim 11, wherein the tipping point T has a value that is equal to about half of the size of a full lot.

24. The non-transitory computer-readable storage medium of claim 18, wherein the tipping point T has a value that is equal to about half of the size of a full lot.

* * * * *